US012671755B2

(12) United States Patent
Peeters

(10) Patent No.: US 12,671,755 B2
(45) Date of Patent: *Jun. 30, 2026

(54) COMPOSITE FASTENER

(71) Applicant: FYX BV, Sint-Niklaas (BE)

(72) Inventor: Ivan Peeters, Beveren (BE)

(73) Assignee: FYX BV, Sint-Niklaas (BE)

( * ) Notice: Subject to any disclaimer, the term of this patent is extended or adjusted under 35 U.S.C. 154(b) by 0 days.

This patent is subject to a terminal disclaimer.

(21) Appl. No.: 19/302,979

(22) Filed: Aug. 18, 2025

(65) Prior Publication Data

US 2025/0385962 A1     Dec. 18, 2025

Related U.S. Application Data

(63) Continuation-in-part of application No. 18/929,786, filed on Oct. 29, 2024, now Pat. No. 12,564,249, which is a continuation-in-part of application No. PCT/EP2024/060030, filed on Apr. 12, 2024, and a continuation-in-part of application No. PCT/EP2024/055629, filed on Mar. 4, 2024.

(51) Int. Cl.
A44B 18/00          (2006.01)
H04M 1/02          (2006.01)

(52) U.S. Cl.
CPC ....... H04M 1/0203 (2025.01); A44B 18/0049 (2013.01); A44B 18/0057 (2013.01); A44B 18/0065 (2013.01)

(58) Field of Classification Search
CPC .......... H04M 1/0203; H04M 1/724092; A44B 18/0049; A44B 18/0057; A44B 18/0065
See application file for complete search history.

(56) References Cited

U.S. PATENT DOCUMENTS

| | | | |
|---|---|---|---|
| 12,053,059 B2 * | 8/2024 | Cungu | ..................... A42B 1/22 |
| 2010/0238119 A1 * | 9/2010 | Dubrovsky | ........... G06F 1/1626 |
| | | | 345/169 |

FOREIGN PATENT DOCUMENTS

CH          295638 A     1/1954

* cited by examiner

*Primary Examiner* — Jinsong Hu
*Assistant Examiner* — Farideh Madani
(74) *Attorney, Agent, or Firm* — Hodgson Russ LLP

(57)          ABSTRACT

An improved assembly of joining two different kinds of anchoring elements, at least one of which is flexible, each equipped with anchoring in such a way that when the two surfaces are positioned against each other, they grip and clamp together.

24 Claims, 23 Drawing Sheets

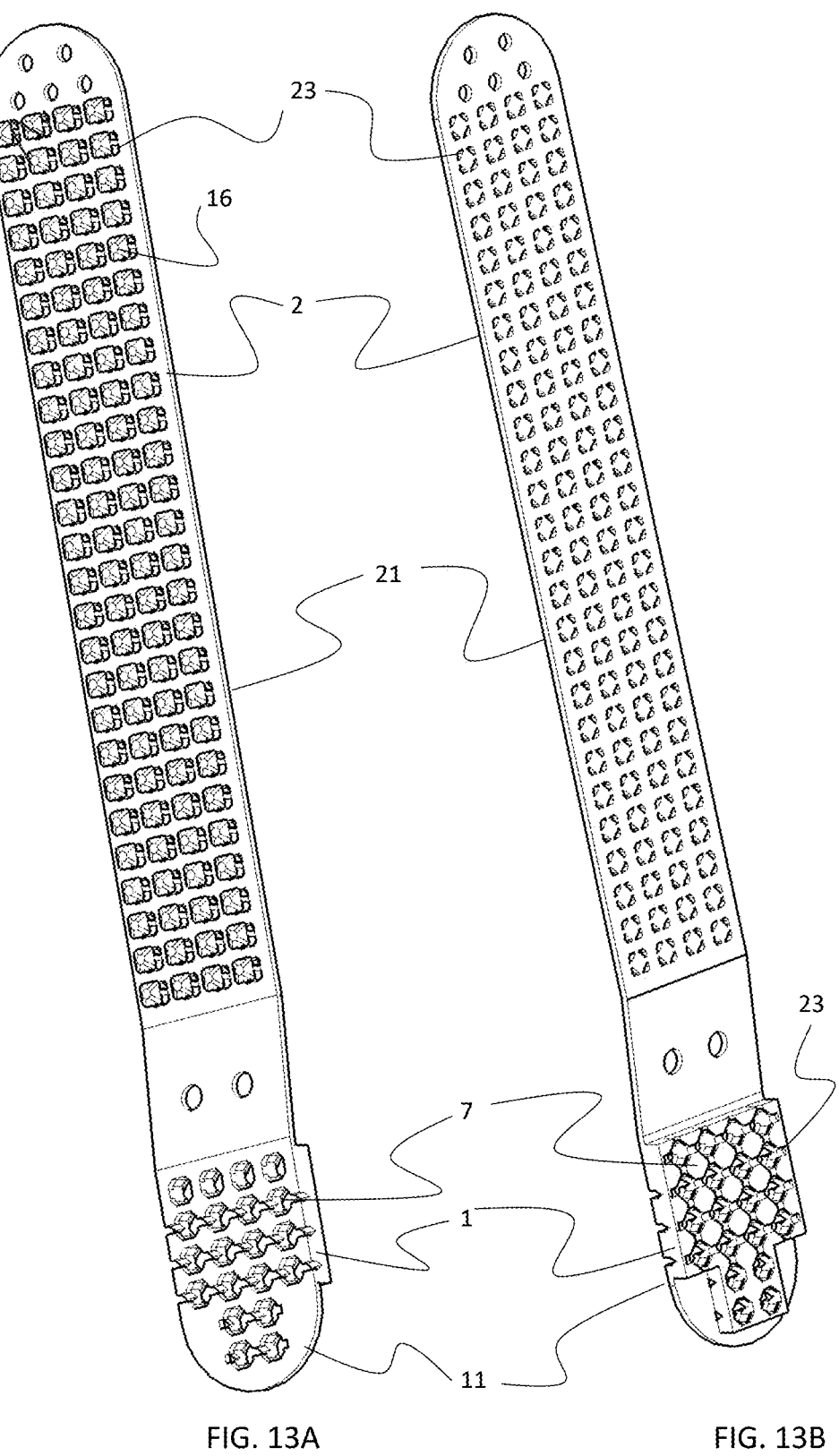
FIG. 13A                    FIG. 13B

FIG. 21A                   FIG. 21B

COMPOSITE FASTENER

CROSS-REFERENCE TO RELATED APPLICATIONS

This application is a continuation-in-part of U.S. patent application Ser. No. 18/929,786, filed Oct. 29, 2024, the entire disclosure of which is incorporated herein by reference.

FIELD

The present invention concerns a (frame-shaped) composite fastener consisting of two components that can connect to each other in a non-permanent manner. The operation resembles a hook-and-loop fastener yet features distinct technical advantages.

STATE OF THE ART

The so-called hook-and-loop fasteners are the most well-known quick closures, which intend to connect two components.

These hook-and-loop fasteners are often termed Velcro, because of the brand's prominence.

Hook-and-loop fasteners consist of two components: typically, two linear fabric strips (or, alternatively, round "dots" or squares) that are attached (sewn or otherwise sutured) to the facing surfaces to be attached. The first part is equipped with smaller hooks; the second has smaller loops. When the two are pressed together, the hooks get stuck in the loops, and the two components are temporarily fastened or bound. When separated, the strips emit a characteristic tearing sound as the two surfaces are either pulled apart or peeled off.

Mr. George De Mestral invented the original hook-and-loop fastener technique. He applied for a patent CH295638A in 1951 with Velcro SA as the applicant.

This hook-and-loop technique has some specific advantages and disadvantages.

The advantages are that it is quite efficient and is now a well-known technique. It is also washable, which helps maintain its cleanliness over time.

However, there are also a range of drawbacks to it. It is expensive to make, loses its effectiveness over time and tends to accumulate hair, dust and fur in the hooks after a few months of regular use. The loops can become elongated or broken after prolonged use. The hooks are often attached to garments, especially loosely woven items like sweaters. These clothes can be damaged when one tries to remove the hook-and-loop fastener, even if the sides are slowly separated. It also absorbs moisture and perspiration when worn on the skin, which means it will smell if not washed.

In addition to Velcro's original hook-and-loop fastener, there are also various market variants. The Slidingly Engaging Fastener is designed to address various issues with common hook-and-loop fasteners. Heavy-duty variants feature mushroom-shaped stems on each clasp surface, providing an audible click when the surfaces interlock. Additionally, a strong pressure-sensitive adhesive secures each component to its substrate.

SUMMARY

The present invention and versions thereof offer a solution to one or more of the disadvantages mentioned earlier. To this end, the present invention relates to composite fasteners and processes as described in the claims and further below.

The present invention relates in the first aspect to composite fasteners consisting of at least a first click element or carrier and a second click element or carrier, at least wherein the first click element comprises a coupling surface that is provided with pins that have a number of overhanging lips that extend laterally from the pin and are undercut below the lips, and an opposite second click element that comprises a coupling surface with recesses, and wherein the two click elements can click together. The second click element or carrier comprises a coupling surface with many recesses, preferably arranged in a regular grid pattern, preferably with equidistant rows and columns, forming a regular matrix pattern, typically rectangular or square. Each coupling surface is provided with anchoring segments that interact to removably lock the two click elements together.

The first click element or carrier comprises a coupling surface with many pins, preferably in a regular grid pattern, preferably with equidistant rows and columns forming a regular matrix pattern, typically rectangular or square.

According to a specific preferred design, the second click element comprises at least one coupling surface with many recesses, preferably in a regular grid pattern, preferably with equidistant rows and columns forming a regular matrix pattern, typically rectangular or square and the first click element comprises at least one coupling surface with many pins on top, preferably in a regular grid pattern, preferably with equidistant rows and columns forming a regular matrix pattern, typically rectangular or square.

The recesses of the second click element comprise at least one anchoring segment along the walls, which creates an opening with a smaller radius than an underlying segment (cutout or cavity), and, optionally, a smaller or equal radius than an overlying segment. The walls of the recess are preferably formed from a flexible material but can also be formed from a rigid material.

The ribs within the recesses of the second click element are spaced such that the distance between the anchoring segments of these ribs of the second element is equal to or less than the radius of the anchoring segments of the pins on the first element, such that when the two elements are brought together with their coupling surfaces facing each other, the lips and ribs securely interlock.

The pins of the first click element comprise at least one anchoring segment or lip along the longitudinal axis, which extends laterally from the longitudinal axis, and has a greater radius than an underlying segment (cutout), and, optionally, a greater radius than an overlying segment (cutout or pin top). The pins are preferably constructed from a flexible material.

The pins on the (click) elements are spaced such that the anchoring segments of the pins of the first element are at a distance from each other that is equal to or greater than the smallest distance of the anchoring segments of the recesses of the second element, such that when the two elements are brought together with their coupling surfaces facing each other, the lips and ribs securely clamp onto each other.

The pins comprise of a base portion, with which they extend (longitudinally) from the coupling surface, and which transitions into a top portion where the anchoring segments or lips are arranged, thereby 'broadening' the top portion relative to the base portion. In some variants, the base portion can connect to the coupling surface via a broadened base, which can have a radius that is greater than the base portion or even than the top portion.

In some embodiments, the pins are multi-level, with a second base portion extending from the top of the top portion, and again transitioning into a second top portion, and potentially even into a third, fourth, etc.

The shape of the pins must be taken into account. For example, pins with square transverse cross-sections require a different interaxial distance compared to pins with disc-shaped transverse cross-sections.

"Transverse cross-sections" refer to cross-sections of the pins in a plane that is perpendicular to the lengthwise axis or longitudinal axis of the pins. Depending on the specific shape of the cross-section, the dimensions of the anchoring segments and the cutouts below can be adjusted to ensure successful anchoring. Additionally, these dimensions can be further adjusted—increasing the difference between the radius of anchoring segments and cutouts for a stronger connection, or decreasing it for a weaker connection.

The invention can thus be considered as a fastener comprising a first click element and a second click element, the first and second click element comprising coupling surfaces, wherein the coupling surface of the first click element comprises a plurality of flexible coupling pins and the coupling surface of the second click element comprises a plurality of recesses, the recesses dimensioned for clampingly receiving the coupling pins. Preferably, the first click element is a phone cover accessory and the second click element is a phone cover.

The coupling pins comprise a base portion and a top portion. The top portion preferably has a conical, pyramidal, truncated conical or truncated pyramidal shape, and preferably narrows towards the apex of the top portion. This can also be in the form of a sphere, ovoid, or even a spherical or ovoid segment, or combinations of a spherical or ovoid segment with other geometrical shapes, preferably to ensure that it's easier to couple the two click elements than to decouple them. The top portion comprises at least one, preferably two, or even three or four, separate overhanging lips which extend radially relative to the base portion, wherein the lips comprise a bottom surface that is perpendicular to the longitudinal axis of the pin and/or slants downwards to the coupling surface of the first click element as it extends radially. In case of a single lip, this can be present on one side of the top portion, but may alternatively extend fully or partly around the top portion.

The top portion typically narrows towards the apex thereof, but in some variations has a constant cross-section towards the apex, for instance circular, oval, rectangular, square, polygonal, etc.

The recesses comprise a through-hole that includes at least one, preferably two, or even three or four, preferably flexible ribs extending inwardly from the perimeter of the through-hole, optionally wherein the ribs are positioned in the same configuration as the lips. In case of a single rib, this can be present on one side of the recess, but may alternatively extend fully or partly around the perimeter.

It should be emphasized that a higher number of lips and/or ribs is considered per pin or recess, for instance 5, 6, 7 or 8 or more, which may or may not be positioned in a regular pattern.

The through-hole has an opening that is reduced in size by the ribs to restrict unobstructed passage of the top portion and only allowing passage of the top portion under a predetermined minimal force or pressure exerted on the coupling surfaces. Thus, without applying a necessary force, the pins cannot be pushed into the recesses, and vice versa, they cannot be pulled out of the recesses without sufficient force.

The opening is dimensioned to allow unobstructed passage of at least a superior segment of the base portion of the pins when the projections of the lips and the ribs along the longitudinal axis of the pins are at least partly overlapping.

According to a preferred embodiment, the recesses further comprise a receiving cavity extending into the second click element or a hole extending through the second click element, with the through-hole connecting the receiving cavity or hole to a receiving side of the coupling surface of the second click element, wherein the receiving cavity or hole is dimensioned to receive the top portion of the coupling pins when the projections of the lips and the ribs along the longitudinal axis of the pins are at least partly overlapping, but wherein the receiving cavity or hole is not dimensioned to receive the top portion of the coupling pins when said projections are not overlapping. This ensures that pins can only be inserted into the recesses correctly, such that the lips and ribs hook behind each other after insertion.

In a further preferred embodiment, the top portion comprises a bottom perimeter which extends radially relative to the perimeter of the base portion at the lips, wherein the bottom perimeter comprises intermediate sections in between the lips, which are aligned with the perimeter of the base portion directly below said intermediate sections.

In a further preferred embodiment, the base portion has a cross-section with a concave perimeter, which perimeter is preferably substantially cross or plus shaped, the top portion having four lips and four intermediate sections.

Alternatively, the perimeter can be T-shaped, I-shaped, Y-shaped, etc., depending on the number of lips and the position thereof.

In a preferred embodiment, the first click element comprises open passages through the coupling surface thereof at positions directly below the overhanging lips, wherein said open passages are preferably projections of the lips perpendicular to the coupling surface. These cutouts simplify productions techniques, increase flexibility, reduce weight and improve breathability, among other benefits.

In a preferred embodiment, the ribs extend from the perimeter of the through-hole independently from each other.

In a preferred embodiment, the top portion is truncated conical or truncated pyramidal, wherein the top portion comprises a top surface substantially parallel to the coupling surface of the first click element, and wherein said top surface is dimensioned to allow passage through the through-hole when the ribs and lips are aligned. The shape allows easier partial introduction, and gradually deforms the ribs when fully inserting the top portion.

In a preferred embodiment, the ribs are evenly distributed around the perimeter. Alternatively, these ribs may be distributed unevenly, creating a preferred direction of entry/removal.

In a preferred embodiment, the pins and the recesses are arranged in a matching configuration, preferably in either a matrix pattern or a staggered pattern, with predetermined distances between adjacent pins and recesses in the same row, and predetermined distances between adjacent rows of pins and recesses. In a further preferred embodiment, the pins and the recesses are arranged on the coupling surfaces in a plurality of adjacent rows, wherein in between the adjacent rows of the recesses, a groove is provided extending partly into the second click element.

In a further preferred embodiment, the recesses comprise four ribs evenly distributed around the perimeter, wherein each pair of oppositely positioned ribs of each recess defines a diagonal which extends in the plane of the coupling surface of the second click element under an angle between 40° and 50°, preferably about 45°, relative to the rows of the recesses.

In a further preferred embodiment, the pins and the recesses are arranged on the coupling surfaces in a plurality of adjacent rows, wherein a groove is provided parallel to the rows on the receiving side, extending partly into the second click element, each groove splitting the recesses of one of the rows in two equal parts.

In a preferred embodiment, the top portion has an average slope between 20° and 70°, preferably between 30° and 60°.

In a preferred embodiment, the lips extend from the perimeter over a distance of at least 0.2 mm, preferably at least 0.3 mm, and/or at most 1.5 mm, preferably at most 1.0 mm.

In a preferred embodiment, the ribs have a maximal thickness of about 1.5 mm, preferably about 1.0 mm. In a preferred embodiment, the ribs have a minimal thickness of about 0.2 mm, preferably about 0.3 mm. Most preferably, both the minimal and maximal thickness apply, thus defining a favored range.

In a preferred embodiment, the top portion comprises an inferior portion with a substantially constant cross-section, upon which inferior portion the top portion transitions into the conical, pyramidal, truncated conical or truncated pyramidal shape, said inferior portion having a minimal height of about 0.05 mm, preferably at least about 0.1 mm. This inferior portion provides the lips with the required strength to withstand minor pressure and force exerted thereon.

In a preferred embodiment, the overlapping parts of the ribs and lips when the coupling pin is received in the recess, are at least 5%, preferably at least 7.5%, of the maximal cross-sectional surface area of the top portion, and wherein the lips corresponding to said overlapping parts have an average thickness of at least 0.25 mm, preferably at least 0.40 mm, and more preferably at least 0.50 mm. The above minimal overlapping surface area ensures that the lips and ribs contact each other such that the pins are held in the recess unless a sufficient force/pressure is exerted thereon.

In a preferred embodiment, the pins comprise a second base portion and a second top portion, said second base portion extending axially from the top portion, and said second top portion extending axially from the second base portion, wherein said second base portion is substantially equal in shape to the base portion, and said second top portion being substantially equal in shape to the top portion. Alternatively, the shapes may vary to achieve different connection strengths, or to mark specific matchups of pins and recesses.

In that light, in a further preferred embodiment, the fastener comprises a third click element, said third click element comprising a coupling surface which comprises a plurality of recesses, the recesses of the third click element dimensioned for clampingly receiving the coupling pins. The recesses of the third click element comprise a through-hole, and wherein the through-hole comprises at least one, preferably two, or even three or four, ribs extending inwardly from the perimeter of the through-hole, optionally wherein the ribs are positioned in the same configuration as the lips. The through-holes have an opening reduced by the ribs to restrict passage of the top portion and only allow passage of the top portion under a predetermined minimal force or pressure exerted on the coupling surfaces. The opening is dimensioned to allow unobstructed passage of at least a superior segment of the base portion when the projections of the lips and the ribs along the longitudinal axis of the pins are at least partly overlapping.

6

In an even further preferred embodiment, the recesses of the third click element further comprise a receiving cavity extending into the third click element or a hole extending through the third click element, and the through-hole connecting the receiving cavity or hole to a receiving side of the coupling surface of the third click element, and the receiving cavity or hole is dimensioned to receive the top portion of the coupling pins when the projections of the lips and the ribs along the longitudinal axis of the pins are at least partly overlapping, but wherein the receiving cavity or hole is not dimensioned to receive the top portion of the coupling portions when said projections are not overlapping.

Most preferably, the third click element is generally configured similar or equal to the second click elements, especially in terms of shape and configuration of the recesses. Further similarities may apply as well, such as number of recesses, general outline of the coupling surface, etc.

It should be noted that in some embodiments, the first and second (and/or third) click elements are single-piece, and fixedly connected, for instance via a loop.

According to a preferred embodiment, the click elements are periodically equipped with a series of pins in a first click element that features a set of protrusions or anchoring segments (also referred to as lips) and cutouts below on the side, along with a series of recesses on a second click element that includes a set of protrusions or anchoring segments with cutouts below and/or above in the wall of the recesses, with the protrusions within the recesses of the second click element designed to align with the cutouts beneath the anchoring segments of the pins of the first click element, and vice versa. In the subsequent descriptions, the cutouts of the pins are also referred to as overlying, underlying, or intermediate segments in relation to the lips (or protrusions or anchoring segments). Similarly, the cutouts in the recesses of the second element are also referred to as overlying, underlying, or intermediate segments relative to the ribs (or protrusions or anchoring segments)

In a preferred embodiment, at least one partition wall of the recesses of the receiving element includes a flank designed to ensure that when the click elements are pressed together, the pin within the recess is securely tightened. Preferably, the corresponding flank of the pin features a complementary shape that secures the pin within the recess.

There are several variants of sloping flanks that facilitate the snapping together of the two elements. The flanks can be designed so that their angles match those of the corresponding walls of the recess, ensuring a precise fit. One common variation is a simple slanted flank, where the pin and the wall of the recess engage at matching angles. This angle preferably ranges from 0 to 45°, with an optimal inclination between 10 and 30°, ideally around 20°, to achieve a balance between locking strength and ease of release.

Another variant is the progressive bevel edge, where the angle of the flanks gradually changes as the pin slides deeper into the recess. Additionally, there are asymmetrical sloping flanks, where one side of the pin has a steeper slope than the other. This asymmetry enables directional clicking, allowing the element to be easily fixed in one direction while simplifying detachment in the opposite direction.

A trapezoidal sloping flank can also be employed, where the pin's flanks not only feature an angle but also vary in width. This variant enhances grip during the clicking and locking of the two elements. Furthermore, combinations of straight and curved angles can be used, with the flanks incorporating both linear and curved elements to allow for firm locking and controlled movement during clicking. These variants offer flexibility in the design of click connections, allowing for customization based on specific application requirements.

The flanks can be straight, curved, or even irregular in shape, with at least part of the recess wall's flank making contact with the corresponding flank of the pin. This contact ensures that, under pressure, the two click elements remain in position, or are preferably drawn towards each other. A variant in shape may include a toothed joint, where, upon applying longitudinal force to the pin, it hooks behind a rib located on the wall of the recess.

There are several design variants for the toothed joint. One version is the straight-tooth connection, where the pin hooks behind a straight rib on the recess wall, providing a secure and simple connection under longitudinal force. Another option is the oblique-tooth joint, where the rib has a slanted angle that gradually pulls the pin into the recess for secure locking, which is particularly useful when a degree of slack or variable locking force is desired.

Additionally, there are curved or wavy teeth, where the ribs have a curved or undulating shape. This configuration allows for greater flexibility, making it suitable for applications requiring controlled movement or a dynamic connection. A more irregular option is the whimsical tooth design, where the ribs have an irregular shape for enhanced grip, securely locking the pin within the recess. This design is particularly useful for applications that require increased resistance to longitudinal movement.

Multiple ribs or teeth can be integrated into the recess wall, allowing the pin to lock in multiple stages. This multi-stage locking system enhances strength and may provide a controlled release. An asymmetrical tooth design is also possible, where the teeth or ribs on one side of the recess differ in shape or size from those on the opposite side. This creates a preferred locking direction, where the pin securely locks in one direction while being more easily released in the other.

These various designs allow for flexibility in click connection design, enabling adjustments based on the required connection strength, stability, and ease of release.

In a preferred embodiment, the pins on the click elements are spaced farther apart from each other than the centers of the corresponding openings on the receiving click element, when measured from the center.

In a preferred embodiment, the pins of the click element have a rectangular shape when viewed from above. However, various other shapes are possible, including designs with a thickened top, potentially in the form of barbs. For example, a pin may have a round, cylindrical, or oval shape.

Another variant is a square pin, which resembles the rectangular shape but can be inserted from multiple directions due to its symmetrical form. Pins may also have a triangular shape with tapered sides, allowing them to securely clamp once fully inserted into the recess.

More complex shapes are also feasible, such as trapezoidal pins, where the base is wider than the top. In specific cases, a pin may have an irregular shape to provide additional grip or resistance, particularly when increased locking force or unique click characteristics are required. Additionally, pins can be textured or ridged to increase friction, ensuring a more reliable locking within the corresponding recess.

In a preferred embodiment, the recesses of the click element have a rectangular shape when viewed from above. However, other shapes are possible, including those with modifications to the edges, such as recesses or thickenings to enhance the locking. A recess may, for example, be round, cylindrical, or oval, allowing for various types of connections with the corresponding element.

Another variant is a square recess, similar to the rectangular form but enabling connections from multiple directions due to its symmetrical design. Recesses may also have a triangular shape with tapered walls, enabling the corresponding element to clamp securely once fully inserted.

More complex shapes, such as trapezoidal recesses, where the base is wider than the top, ensure that the corresponding element is more securely attached as it is inserted deeper into the recess. In specific cases, the recess may have an irregular shape to provide additional grip or resistance, which is particularly beneficial when increased locking force or unique click characteristics are required. The walls of the recess can also be textured, ridged, or otherwise modified to add friction, ensuring a reliable lock with the corresponding click element.

According to a preferred embodiment, the first and/or second elements are flexible. Preferably, for the first element, the carriers and pins on them are of a single-piece construction, facilitating, for example, manufacturing through methods such as 3D printing, injection molding, or other automated processes.

According to a preferred embodiment, the pins on the first element feature multiple anchoring segments, with segments (cutouts) that have a smaller radius. Preferably, all anchoring segments have substantially the same shape and dimensions and recesses in relation to each other. The recesses in the second element feature multiple anchoring segments, with segments (cutouts) that have a greater radius.

The general principle of the present invention is a method in which the pins and the recesses of two different click elements exert a clamping force on each other, resulting in a secure clamping effect between the click elements.

According to one aspect of the invention, the quick closure is formed by snapping together two corresponding first click elements. This includes a base made of a plastic plate with pins on one side, wherein the sides of these pins are equipped with cutouts. These cutouts can be flat but can also have the shape of a barb. The hooks of these barbs are directed towards the surface of the base, with the barb's function being active in the direction away from the surface and perpendicular to the base plate. Preferably, the barbs are positioned at the corners of the anchoring segments. Additionally, by appropriately positioning the barbs, it can be ensured that for two anchored click elements at rest, the barbs of the pins of a first click element, coincide with the barbs on the ribs of the second click element, thereby hooking together. The number of cutouts in the pins is at least one per side, but preferably two, three, or even more. The pins can be square in shape, with the top being beveled and/or rounded. These pins are spaced apart from each other in an ordered pattern. Depending on the applications and relevant compatible specifications, this spacing can be equal in the x and y directions.

According to an embodiment of the invention, the base portion comprises a, preferably essentially rectangular, longitudinal cross-section with a first set of two opposite sides and a second set of two opposite sides perpendicular to the first set, wherein the top portion comprises two overhanging lips which extend radially relative to the base portion on the first set of two opposite sides, and wherein the top portion does not extend radially relative to the base portion on the second set of two opposite sides, and wherein the first set of opposite sides for each of the coupling pins on the first click element are oriented parallel to a shared axis.

According to an embodiment of the invention, the two overhanging lips comprise a downwardly sloping and/or downwardly hooked bottom side, preferably comprising a flat bottom plane at the distal edge of the overhanging lips, said flat bottom plane being substantially perpendicular to the base portion. Preferably, the bottom side of the overhanging lips substantially matches the top side of the ribs in terms of profile, to complement each other as much as possible, thus increasing the interlocking thereof. The hooked/sloping bottom side increases the coupling effect, functioning similarly to a barbed anchoring.

According to an embodiment of the invention, the coupling surface of the first click element comprises cutouts over at least 50%, preferably at least 75%, more preferably at least 95% of the perpendicular projection of the overhanging lips onto said coupling surface.

According to an embodiment of the invention, the coupling pins comprise a groove extending from the top portion at least partly into the base portion, said groove being positioned symmetrically between the two opposite sides of the first set, allowing for easier entry into the recesses, past the ribs.

According to an embodiment of the invention, the through-hole comprises a, preferably essentially rectangular, longitudinal cross-section with a first set of two opposite sides and a second set of two opposite sides perpendicular to the first set, wherein the ribs extend inwardly from the two opposite sides of the first set, and wherein the two opposite sides of the second set do not contain said ribs. Only providing the ribs at two opposite sides simplifies production and reduces the rigidity of the fixation, allowing easier decoupling, while also allowing the second click element to be bent more easily.

According to an embodiment of the invention, the ribs do not extend along the opposite sides of the first sets up to the opposite sides of the second set, preferably wherein the ribs and the opposite sides of the second set are separated by an interstice, more preferably wherein the ribs have a width along the opposite sides of the first set of at most 75% of the distance between the opposite sides of the second set, more preferably at most 66%, even more preferably at most 50%. This allows for a reduced fixation strength, which is of interest for specific applications.

According to an embodiment of the invention, the ribs extend along the opposite sides of the first sets up to the opposite sides of the second set. This increases the strength of fixation, which is of interest for specific applications.

According to an embodiment of the invention, the base portion of the coupling pins is reinforced, and comprises a broadened base bottom at the opposite sides of the second set, which extends laterally with a curved or slanted profile away from the base portion towards the coupling surface, preferably the broadened base bottom positioned in the lower half of the base portion. Given that the coupling pins are relatively thin, the added support, in the opposite direction in which the first click element would typically be bent, increases the strength of the coupling pins.

According to an embodiment of the invention, the coupling pins are arranged in at most 8, preferably at most 6, more preferably at most 4, most preferably at most 3, subsequent rows along an axis extending between the opposite sides of the first set.

This allows the first click element sufficient flexibility to bend and still be able to connect to a second click element (the bending will result into a growing offset between the two click elements, which at a certain point will no longer allow connection), while providing sufficient anchoring when the coupling pins are fixed into the recesses. Preferably, the rows comprise at least 2, 3, 4, 5, or more coupling pins each, but in a specifically preferred embodiment, the number of coupling pins per row is at most 6 or even 5, 4 or 3. The recesses can be arranged in a greater number of rows (and/or greater number of columns), to allow multiple anchoring configurations.

According to an embodiment of the invention, the ribs are positioned in pairs, with a first rib of each of the pairs being positioned on the opposite side of the through-hole with respect to the second rib of the pairs, and wherein the first rib and the second rib of each of the pairs comprise a barb at the distal end of the ribs, wherein the barb of the first rib is angled at least partially upward with respect to the coupling surface of the second click element, and wherein the barb of the second rib is angled at least partially downward with respect to the plane of the coupling surface of the second click element. This provides for an asymmetric disposition which facilitates removal by favoring the removal to one side.

According to an embodiment of the invention, the recesses are positioned in a grid, preferably square or rectangular, and are separated from each other by a matching grid of walls, wherein both neighboring recesses comprise at least one first rib or both neighboring recesses comprise at least one second rib on each side of the wall separating said neighboring recesses.

According to an embodiment of the invention, the ribs comprise a top barb and a bottom barb at the distal end of the ribs, said top and bottom barb projecting both upwards and downwards with respect to the plane of the coupling surface of the second click element. This configuration allows the first click element to be reliably coupled on both sides of the second click element.

According to an embodiment of the invention, the first click element and the second click element are fixedly attached via a connecting section, and, wherein the fastener comprises a loop with an inner dimension equal to or larger than the width of the first and/or second click element, with said loop being positioned at a first end of the fastener with respect to the first and second click element. This allows the fastener to be used as a cable fastener for instance.

According to an embodiment of the invention, preferably the fastener serves as a shoe fastener, with the fastener comprising an additional first click element or an additional second click element, wherein either the first click element and the additional first click element comprise a fixing eyelet at a first distal end thereof and a bracket with an inner dimension equal to or larger than the width of the second click element at a second end thereof, and wherein the second click element and the additional second click element comprise an upstanding end stop configured to hook behind the bracket, or wherein the second click element and the additional second click element comprise a fixing eyelet at a first distal end thereof and a bracket with an inner dimension equal to or larger than the width of the first click element at a second end thereof, and wherein the first click element and the additional first click element comprise an upstanding end stop configured to hook behind the bracket. Such a configuration allows the length of the combined click elements to be adjustable, while ensuring that the connection is strong enough to be relied on.

According to an embodiment of the invention, the fastener further comprises an additional first click element, wherein the second click element comprises an additional coupling surface adjacent to the coupling surface, said additional coupling surface being positioned on the opposite side of the fastener with respect to the coupling surface of the second click element.

According to an embodiment of the invention, the first click element and the additional first click element each comprise a connecting section configured to connect the first and additional first click element, such that the coupling surfaces of the first and additional first click element are distanced over a distance essentially equal to the thickness of the coupling surface of the second click element. This allows the second click element to essentially be locked in between the first and the additional first click element.

According to a preferred embodiment of the invention, the through-holes are essentially rectangular with two oppositely positioned long sides and two oppositely positioned short sides, with the ribs positioned at the long sides, and with an inner flank tooth or flank bump at the short sides, wherein the lips are positioned on opposite sides of the pins and dimensioned such that the pins are wider at the lips than the distance between the ribs in the through-holes, and wherein the pins comprise one or more lateral teeth or lateral bumps on the flanks of the pins that connect the sides with the lips, said lateral teeth or lateral bumps being configured for being suspended on the inner flank tooth or flank bump of the recesses, and wherein the lateral teeth or lateral bumps are dimensioned such that the pins are more narrow at the lateral teeth or lateral bumps than the distance between the inner flank teeth of the recesses, thereby allowing movement of the pins in the recesses along the long side of the recesses. In this embodiment, the recesses are oriented such that they are aligned with the longitudinal direction of the second click element (i.e., that the recess is longer along the longitudinal direction than it is wide). This gives the pins some margin for movement, which is crucial to allow the click elements to bend, in which case the lengthwise deformation of the click elements is shifted, causing a relative displacement between the pins and the recesses. This displacement is accommodated by the recesses being longer in the longitudinal direction. By providing the lateral teeth or bumps, and the matching inner flank tooth or flank bump, it is furthermore ensured that the pins and recesses have a reliable connection.

In a variation, the invention is a fastener comprising a first click element, a second click element and a third click element, the first, second and third click elements comprising coupling surfaces, wherein the coupling surfaces of the first and third click elements comprise a plurality of flexible coupling pins and the coupling surface of the second click element comprises a plurality of recesses, the recesses dimensioned for receiving the coupling pins. The coupling pins comprise a base portion and a top portion. The top portion preferably has a conical, pyramidal, truncated conical or truncated pyramidal shape, and preferably narrows towards the apex of the top portion. The top portion comprises at least one overhanging lip, but preferably at least two, or even more preferably three or four, separate overhanging lips which extend radially with respect to the base portion, wherein the lips comprise a bottom surface that is perpendicular to the longitudinal axis of the pin and/or slants downwards to the coupling surface of the first click element as it extends radially. The coupling pins of the first click element are grouped in pairs of two or more aligned coupling pins, wherein neighboring coupling pins of the pair are distanced such that the distance between the top portions thereof is larger than the width of the base portion of the coupling pins of the third click element, and smaller than the width of the top portion of the coupling pins of the third click element. The recesses comprise a through-hole, and wherein the through-hole comprises at least one, preferably two, or even three, more preferably at least four, preferably flexible ribs extending inwardly from the perimeter of the through-hole. Optionally, the recess comprises a single rib, which may extend fully or partly around its perimeter, but in other variations is only present on one side of the recess. The through-holes have an opening reduced by the ribs to restrict unobstructed passage of the pairs of coupling pins and only allowing passage of the top portion of said pairs of coupling pins under a predetermined minimal force or pressure exerted on the first and second coupling surfaces towards each other. The opening is dimensioned to allow unobstructed passage of at least a superior segment of the base portion of the pairs of coupling pins when the projections of the lips and the ribs along the longitudinal axis of the pins are at least partly overlapping. The inwardly facing lips of the pairs of coupling pins are dimensioned to restrict unobstructed passage of the coupling pin of the third click element and only allowing passage of the top portion of said coupling pins of the third click element under a predetermined minimal force or pressure exerted on the first and second and third coupling surfaces towards each other.

According to an embodiment of the variation on the invention, the first and third click element each comprise a connecting section configured to connect the first and third click element, such that the coupling surfaces of the first and third click element are distanced over a distance essentially equal to the thickness of the coupling surface of the second click element.

According to an embodiment of the invention, the first click element and the second click element are made of materials with a different stiffness.

According to an embodiment of the invention, the coupling pins and recesses are arranged in a rotationally symmetric pattern, allowing the first click element to engage with the second click element at multiple relative rotational positions.

According to an embodiment of the invention, the fastener further comprises alignment features on the coupling surfaces, such as protrusions or grooves, to assist in aligning the first click element with the second click element during engagement.

According to an embodiment of the invention, the base portion of the coupling pins comprises reinforcing structures to prevent deformation or breakage during repeated use.

According to an embodiment of the invention, the coupling pins have a gradient or slope in the z-direction ranging from 0° to 5°.

According to an embodiment of the invention, the fastener is integrated into wearable items such as bracelets, straps, or belts, providing adjustable length by selectively engaging different rows of coupling pins and recesses.

According to an embodiment of the invention, the fastener is incorporated into a mobile device cover, allowing accessories equipped with corresponding click elements to be attached and detached from the mobile device cover.

According to an embodiment of the invention, the coupling surfaces include a handle or tab to facilitate the separation of the first and second click elements.

According to an embodiment of the invention, the coupling pins and recesses are arranged in a staggered pattern to enhance the fastening strength and distribute stress evenly across the coupling surfaces.

According to an embodiment of the invention, the fastener comprises a locking mechanism that further secures the engagement of the coupling pins and recesses against unintended separation.

According to an embodiment of the invention, the second click element includes flexible walls or gutters adjacent to the recesses to increase flexibility and facilitate the clamping of the coupling pins.

According to an embodiment of the invention, the fastener is used as a component in a shoe strap assembly.

According to an embodiment of the invention, the first click element has a thickness (excluding the coupling pins) of at least 0.5 mm, preferably at least 1.0 mm, more preferably at most 1.5 mm or 2.0 mm. The thickness is preferably at most 5.0 mm, more preferably at most 2.5 mm. This thickness is particularly suitable for materials with a Shore hardness close to D45.

According to an embodiment of the invention, the coupling pins have a dimension between the opposite sides of the second set ranging from 0.75 mm to 9.0 mm, preferably from 1.0 mm to 8.0 mm, more preferably from 1.5 mm to 7.5 mm, such as around 2.0 mm, 2.5 mm, 3.0 mm, 3.5 mm, 4.0 mm, 4.5 mm, 5.0 mm, 5.5 mm, 6.0 mm, 6.5 mm, 7.0 mm, or values therebetween. The recesses have a dimension between the opposite sides of the second set ranging from 1.0 mm to 15.0 mm, preferably from 2.0 mm to 12.5 mm, more preferably from 3.0 mm to 10.0 mm, or for instance from 4.0 mm to 9.0 mm, or from 4.5 mm to 8.0 mm, such as around 5.0 mm, 5.5 mm, 6.0 mm, 6.5 mm, 7.0 mm, 7.5 mm, 8.0 mm, 8.5 mm, or values therebetween.

According to a preferred embodiment of the invention, the coupling pins have a dimension between the opposite sides of the second set ranging from 1.5 mm to 4.5 mm, preferably from 2.0 mm to 4.0 mm, more preferably from 2.5 mm to 3.5 mm, such as around 3.0 mm. The recesses have a dimension between the opposite sides of the second set ranging from 2.5 mm to 7.5 mm, preferably from 3.0 mm to 6.0 mm, more preferably from 3.5 mm to 6.5 mm, even more preferably from 4.0 mm to 6.0 mm, even more preferably from 4.5 mm to 5.5 mm, such as around 5.0 mm.

According to a preferred embodiment of the invention, the coupling pins and the recesses have a dimension between the opposite sides of the second set that corresponds to a ratio ranging from 0.3 to 0.9, preferably from 0.4 to 0.8, more preferably from 0.5 to 0.7, most preferably about 0.6.

According to an embodiment of the invention, the coupling pins have a dimension between the opposite sides of the first set ranging from 1.0 mm to 9.0 mm, preferably from 1.5 mm to 8.0 mm, more preferably from 2.0 mm to 7.0 mm, such as around 3.0 mm, 3.5 mm, 4.0 mm, 4.5 mm, 5.0 mm, 5.5 mm, 6.0 mm, 6.5 mm or higher values, such as 7.0 mm, 7.5 mm, 8.0 mm, 8.5 mm, or values therebetween. This refers to the maximal width of the coupling pins along this axis (i.e., width of the widest part of the top portion, distance between distal edges of the overhanging lips). The recesses have a dimension between the opposite sides of the first set ranging from 1.5 mm to 15.0 mm, preferably from 2.0 mm to 12.5 mm, more preferably from 2.5 mm to 10.0 mm, even more preferably from 3.0 mm to 8.0 mm, even more preferably from 3.5 mm to 6.0 mm, such as 4.0 mm, 4.5 mm, 5.0 mm, 5.5 mm, or higher values, such as 6.0 mm, 6.5 mm, 7.0 mm, 7.5 mm, 8.0 mm, 8.5 mm, 9.0 mm, 9.5 mm, or values therebetween. This is the maximal width without the ribs.

According to a preferred embodiment of the invention, the coupling pins have a dimension between the opposite sides of the first set ranging from 1.5 mm to 4.5 mm, preferably from 2.0 mm to 4.0 mm, more preferably from 2.5 mm to 3.5 mm, such as around 3.0 mm. The recesses have a dimension between the opposite sides of the first set ranging from 2.5 mm to 7.5 mm, preferably from 3.0 mm to 6.0 mm, more preferably from 3.5 mm to 6.5 mm, even more preferably from 4.0 mm to 6.0 mm, even more preferably from 4.5 mm to 5.5 mm, such as around 5.0 mm.

According to an embodiment of the invention, the coupling pins and the recesses have a dimension between the opposite sides of the first set with a ratio ranging from 0.3 to 0.9, preferably from 0.4 to 0.8, more preferably from 0.5 to 0.7, most preferably about 0.6.

As mentioned, the above dimensions were found particularly suitable for materials with a Shore hardness around D45 but not limited thereto, and apply to values within a range thereof, for instance from D10 to D90, in particular from D20 to D60.

It should furthermore be noted that, in case of substantially lower Shore hardness values, it would be within the skill of a person in the art to find it within the spirit of the invention to take measures to increase retention as necessary, by increasing the thickness for instance, by reducing the extension length of the lips or ribs, and/or creating more overlap between the ribs and lips by reducing the margin between their dimensions. Accordingly, it should be considered that the above dimensions may be increased or decreased by up to 50%, preferably up to 30% or up to 25%, to accommodate the use of softer materials. Similarly, for harder materials, the dimensions can be adjusted conversely.

Preferably, the base portions have a substantially rectangular, or even square, cross-section.

Another aspect of the invention is that the quick closure is achieved by snapping together two different click elements. The first click element comprises a base made of a plastic plate with pins on one side, wherein the sides of these pins are equipped with cutouts and lips and anchoring segments. These cutouts, in conjunction with the anchoring segments, are equipped with one or more barbs. The hooks of these barbs are directed towards the surface of the base, where the function of the barb is active when the retained element moves perpendicularly away from the surface of the base plate.

The number of cutouts is at least one per side, but preferably two, three or even more. The pins can be square in shape, with the top being beveled and/or rounded. These pins are spaced a certain distance apart from each other in an ordered pattern. This distance is preferably essentially equal in both the x and y directions. The interaxial distance between directly adjacent pins (closest pins) of the first click element is identical to the interaxial distance between directly adjacent recesses of the second click element.

In a preferred embodiment, the pins on the first element are equipped with two or more lips or anchoring segments stacked on top of each other, and the recesses of the second element are equipped with two or more ribs or anchoring segments stacked on top of each other, enabling the click elements to anchor to each other on multiple levels, resulting in a more robust and more reliable attachment According to another aspect of the invention, the pins of the first click element can have shapes other than squares in their transverse cross-section. These shapes can be round, triangular or polygonal (preferably regular polygons, especially hexagonal or octagonal) in general. In terms of height, the pins can have straight, conical, inverted conical, or any other arbitrary shapes. However, the preferred shape is slightly conical with a minimum angle ranging from 0° to 10°, preferably from 0.5° to 5° or even from 1° to 2°, making it easier to remove the shape from the production mold after injection molding. Similarly, the recesses of the second element can have shapes other than squares in their transverse cross-section. These shapes can be round, triangular or polygonal (preferably regular polygons, especially hexagonal or octagonal) in general. In terms of height, the pins can have straight, conical, inverted conical, or any other arbitrary shapes. However, the preferred shape is slightly conical with a minimum angle ranging from 0° to 10°, preferably from 0.5° to 5° or even from 1° to 2°, making it easier to remove the shape from the production mold after injection molding.

According to a preferred embodiment, the dimensions of the pins are as follows:

The height of the pins themselves, from the base plate to the top of a pin, ranges from 1 mm to 5 mm, preferably from 2 mm to 4 mm, and most preferably about 3 mm, with the bottom of the lip of the pin being positioned approximately in the middle. This design aims to make the top of the pin large enough so that the slope at the top is sharp enough to ensure smooth use.

The lip of each pin extends a maximal length over which it extends from the base portion, and the lips have an average thickness along the longitudinal axis, where the ratio of this length to the average thickness ranges from 0.25 to 1.0, preferably from 0.3 to 0.75.

Depending on the material used, these dimensions may vary. For softer materials, it may be appropriate to go higher than 0.75; for harder materials, lower than 0.25.

The base portion of the pin has a minimum diameter of 1.0 mm, preferably 1.5 mm, and the top portion has a maximum diameter of 4.0 mm, preferably 3.0 mm.

A preferred embodiment of a pin is a square pin with rounded (or beveled) corners on the lips with the following dimensions: the height is approximately 3 mm, with a maximum width from side to side of 2.8 mm and a lip length of 0.4 mm (extension relative to base portion). The bottom of the lip is preferably located in the middle of the height of the pin (in this case at 1.5 mm). The cutouts that form the space beneath the lips preferably run through the bottom plate. This makes it easier to produce the combination base plate equipped with pins with lips by means of molding and extrusion techniques. In the case of pins that are equipped with 4 lips, 4 openings are provided in the bottom plate at the level of the 4 lips, each with a minimum width that is similar to the width of the lips of the corresponding lips. The different ribs in the recesses can also be replaced by one continuous recess, possibly varying the thickness at the location where clamping occurs with the lips of the pins.

Another possibility is that the ribs within the same recess differ in thickness and/or width.

The interaxial distances of the pins, in the versions of the pins described above, are preferably 3-6 mm, more preferably 4.5-5 mm. As a result, the wall between the recesses of the second click element is large enough. Advantageously, there are enough pins per $cm^2$ to guarantee a sufficient adhesive force between the elements. This pin density is preferably at least 4 pins/$cm^2$. Shaft spacing of more than 5 mm is also possible if it's not an even pattern. The arrangement of the pins can vary in axial distances in the x and y directions or it can take on a more random pattern. Preferably, this pattern recurs on a regular basis. For the technique described in this invention, it is necessary that the pattern between the elements matches to allow both elements to click together. However, it is not necessary for the number of pins on the first element to match the number of recesses of the second element for it to work. Missing one or more pins does not necessarily interfere with the clicking effect between the two elements.

These ratios may differ in other versions, such as when using certain materials and/or dimensions applying different forces. For example, the pins may increase in size proportionally to the dimensions of the base of the pin and the maximum width of the pin. For specific applications and/or materials, it may be necessary to adjust the base dimensions and possibly the height of the pin while maintaining the lip extension in the range of 0.3-0.4 mm.

The height of the recesses in the base plate of the second click element is preferably the same height as the height of the pins of the element to which it is connected. The recesses are preferably open at the bottom and top which makes the production process much easier. The shape of the recesses should preferably match the shape of the pins they are intended to cover, in the sense that they should be slightly larger, preferably at least 0.1 mm per side. The ribs in these recesses are preferably straight and partial, corresponding to the lips of the pins with which they engage.

According to another aspect of the invention, the clamping between the two elements can be varied by adjusting their dimensions to achieve the desired clamping effect. In the first click element, the dimensions of the base of the pin, the clamping surface of the lips, the material used and the shape of the top can be adjusted according to requirements. Similarly, in the second clamping element, the thickness, depth and the shape of the ribs can be adjusted according to requirements. When clamping the two elements, there is an overlapping portion of the bottom of the lips of the pin with the top of the ribs of the recesses. The surface area of this overlapping area largely determines the clamping force between the two elements. For some applications, it is necessary that a different adhesive strength is provided within the same strip. This can be done in several ways, for example, a strip with pins can be equipped with a first set of pins that are defined differently and can have a second set of pins and even third, fourth or more sets of pins. The pins within the same set are dimensioned differently, resulting in different clamping properties among the different sets. Another possibility is that a strip provided with recesses is equipped with a first set of recesses that are defined differently and may have a second set of recesses and even third, fourth or more sets of recesses. The recesses within the same set are then dimensioned differently, so that there are different clamping properties among the different sets.

In versions where the recesses are open and openings are arranged in the base plate on the pins, both the ribs in the recesses and the lips on the pins can be made in hook or barb form, resulting in enhanced adhesion.

Preferably, the width-to-height ratio of the pins—that is, the ratio of the diameter or side of the base to the height—is between 1:2 and 1:3.

The top of the pin is preferably rounded or at least beveled so that the pins of the first click element find their way quickly to the recesses of the opposing second element.

According to another aspect of the invention, the two click elements may be identical in pattern when hooking together. Here, the center points of the pins and recesses are spaced from each other according to the same pattern. When hooking, the pin of the first click element hooks into the cutouts in the recesses of the second click element. The walls of the recesses can also be made (slightly) conical to simplify the production process.

According to an embodiment, the lips comprise one or more barbs at a distal (free) end thereof, extending downwards towards the coupling surface of the first click element. Preferably, this is coupled with barbs being present at the distal/free end of the ribs, thus allowing the barbed lips and ribs to interact with each other to further ensure retention once coupled.

In the embodiment where the pins of the first click element have a square shape and the anchoring elements are positioned on the corners of the pins, the recesses of the second element are preferably also square shaped (in cross-section) with the anchoring elements or ribs located at the corner of these recesses.

This has the effect that when the two click elements are clicked together, the angular sides of the pin of the first click element press into the lateral sides of ribs of the second element. This creates a point load allowing the pins to be pressed together with a compressive force and pulled back apart with a tensile force, suitable for its applications as is now applied in the current so-called hook-and-loop fastener applications. This is possibly due to the flexible nature of the pins of the first element and, depending on the configuration, potentially the ribs of the second click element as well, enabling the detachment of external pins with the requisite (deliberate) manipulation, and thus allowing the internally located pins the sufficient freedom of movement for detachment. With this version, the click elements can potentially take on a curved shape. Again, it is noted that some adaptations/alterations can be applied to facilitate easier curved shape connections for the fastener, such as additional V-shaped cutouts in the walls of the recesses.

According to another aspect of the invention, the click elements can be composed of a uniform material such as plastics including LDPE, PLA, PVC, EVA, Z-PVC, TPU, TPE, TPU TPV, among others. Moreover, these can be rigid, flexible, or semi-flexible.

However, other materials, such as carbon, steel, copper, and others are also possible. These may or may not be flexible.

Additionally, the click elements that can be clicked together may vary in material.

According to another aspect of the invention, the materials of the click elements can be constructed from composite materials such as a plastic base combined with a steel band, a plastic base combined with steel pins, a steel base with plastic pins, or other possible variants.

According to another aspect of the invention, the basis of the present invention can be further supplemented with a hook connection.

According to another aspect of the invention, the dimensions of the two click elements can be different in size. For example, the height of the pins of the first click element can be different from the thickness of the recess plate so that you get, for example, a click element that is quite stiff in which a more flexible click element can be clamped. However, the click element's length and/or width can also vary. For instance, several smaller click elements can be positioned on a larger click element.

In an alternative aspect, the dimensions, or at least the thickness, are substantially the same for both click elements.

The dimensions of the pins themselves can also vary. This variability applies not only among different click elements but also within the same click element; different sizes, shapes, numbers, and versions of the pins are possible. The cutouts on the pins can also vary among different click elements and even within the same click element.

The dimensions of the recesses themselves can also vary. This variability applies not only among different click elements but also within the same click element; different sizes, shapes, numbers, and versions of the recesses are possible. The cutouts on the pins can also vary among different click elements and even within the same click element.

According to another aspect of the invention, the first click elements may be equipped with pins on both sides of the base plates. Another possible version is that the base plate of the first click element is equipped with pins on one side and on the other side a device to connect to another material using a different technique, such as barbs, glue connections, screw connections, clamp connections or other possible known connection techniques.

Similarly, the recess plate of the second click element may be equipped with ribs on one side and, on the other side, a device to connect to another material using a different technique, such as barbs, glue connections, screw connections, clamp connections, or other possible known connection techniques.

According to another aspect of the invention, the base of the first click element or the recess plate of the second click element may be part of a tool or another instrument. For example, the click element can be integrated into a clamping plier or other clamping mechanisms where the body jaws of the tool or instrument are equipped with the pins as described in the present invention. But other parts such as a profile or a tube can also be equipped with the described pins.

According to another aspect of the invention, the pins of the first click element and/or the recesses of the second element have the following possible shapes in terms of transverse cross-section: rectangle, square, round, polygon, or other possible geometric shapes. The shape can be arbitrary.

For the first click element, all sides of the pins are preferably equipped with cutouts to make the engagement with the opposite pin as efficient as possible.

The combination of cutouts and protrusions can take the form of barbs, squares, triangles wherein the flat side is preferably arranged to hook onto the flat side of the opposite pin, lip shapes wherein the side is made of layered protrusions with a similar effect as in 3D printing, cutouts in any shape, protrusions in random shapes and other possible shapes that allow the hooking of the two opposing pins.

Another possible version is that the pins of the first click element and/or the recesses of the second click element have a rough surface so that the pins experience more resistance when they slide over each other. Thus, a more significant clamping effect is obtained.

According to another aspect of the invention, the pins of the opposing click elements can be permanently connected to each other by using an adhesive bond. This can be achieved by adding external glue or heating the click elements to fuse the pins together. Alternatively, a semi-permanent adhesive bond can be obtained by using external glue with limited adhesive strength or by selecting materials for the pins and/or recess plates that can melt into each other.

Operation:

The principle of the invention is to clamp the pins by applying two click elements—where the first click element is equipped with pins and the second click element is equipped with recesses, by moving them toward each other. Here, the pins are blocked by the anchoring segments in the recesses, creating a clamping effect.

The click elements are not identical, but the patterns of the pins and recesses of the corresponding click elements are similar.

Possible applications of the present invention include, but are not limited to:

Connecting bandages: The first click element with pins is pressed through the bandage. For this specific version, it is preferable to use a bandage with perforations wherein the central point of the perforations is equal to the central points of the pins applied by the bandage. The second click element is connected to the first click element, securing the bandage.

Another possible application is a connection for a walking accessory such as a shoe. The hook-and-loop fastener technique is already frequently used in shoes to replace and/or supplement the well-known laces. The disadvantage of the hook-and-loop fastener technique is that over time it becomes less efficient due to decreased adhesive force and dirt can drastically reduce the operation of the hook-and-loop fastener. The aforementioned disadvantages can be eliminated by applying the present invention's fastening technique. For this application, it is preferable to use the version in which the attachment can take on a curved shape.

In a specific application, the system can furthermore be used as a phone case or cover, with the phone cover being the second click element with recesses, to which a first click element can be connected at a desired position and which then serves as a phone cover accessory.

In a preferred embodiment, the phone cover comprises four raised edges for embracing a mobile phone.

In a preferred embodiment, the phone cover accessory is a phone cover strap, although other options exist, such as an attachment to a chain or link, or as a connector for a phone holder, etc.

In a preferred embodiment, the phone cover strap is substantially elongate and flat with a front and a back side, and comprises the coupling surface with the coupling pins at the front side on at least each of the ends of said phone cover strap. The strap may be straight or can be curved, which can be useful for accommodating a phone lens opening in the cover.

In a preferred embodiment, the top portion of the pins is generally rectangular, and has a set of lips on two opposite sides of the pin, and no lips on the other sides. Of course, rounded or beveled edges are possible, without detracting the general shape of the pin (or recess, for that matter).

In a preferred embodiment, the coupling surface comprises a camera lens opening.

In a preferred embodiment, the through-hole comprises a generally rectangular, longitudinal cross-section with a first set of two opposite sides and a second set of two opposite sides perpendicular to the first set, the sides of the first set adjoining the sides of the second set and separated by corners, wherein the ribs extend inwardly from the two opposite corners.

In a preferred embodiment, the ribs are separated by an interstice, and wherein the ribs have a width along the sides of at most 49%, preferably at most 45% or at most 40%, of the length of said sides.

In a preferred embodiment, the base portion of the plurality of coupling pins is reinforced and comprises a broadened base bottom on at least one set of opposite sides, which extends laterally with a curved or slanted profile away from the base portion towards the coupling surface, wherein the broadened base bottom positioned in a lower half of the base portion.

In a preferred embodiment, the base portion of the plurality of coupling pins is reinforced and comprises a broadened base bottom at the opposite sides of the second seton at least one set of opposite sides, which extends laterally with a curved or slanted profile away from the base portion towards the coupling surface, wherein the broadened base bottom positioned in a lower half of the base portion.

Other possible applications without intending to be exhaustive, include belt connections, tent connections and fences, shin pads, classic wall connections for hanging hooks, mirrors and related items, fixing of or to window screens (the mesh structure is ideal for coupling with the carriers), holding seat upholstery in place, fixing mats, installing insect screens, replacing classic buttons, in diapers, orthoses, swimwear or clothing in general, closing caps or helmets, attaching bicycle accessories, applications in toys, automotive, space, aviation and construction industries. Attaching license plates and cable ties, as a replacement for Velcro in dusty environments or when labeling is required, etc.

Other possible applications, without intending to be exhaustive, include accessories for attachment to the back side of a mobile phone cover, such as a multifunctional strap, a wallet, a lanyard, decorative elements, hand grips, stands, hooks, adapters, power banks, and so on.

DESCRIPTION OF THE FIGURES

The following description of the Figures of specific embodiments of the invention is merely exemplary in nature and is not intended to limit the scope of the present teachings. The corresponding reference numbers on the drawings indicate similar or corresponding parts and characteristics.

FIG. 13A: A perspective top-down view of a combination of the first and second click elements in one piece.

FIG. 13B: A perspective bottom view of a combination of the first and second click elements in one piece.

COMPONENTS

Figure 1A:
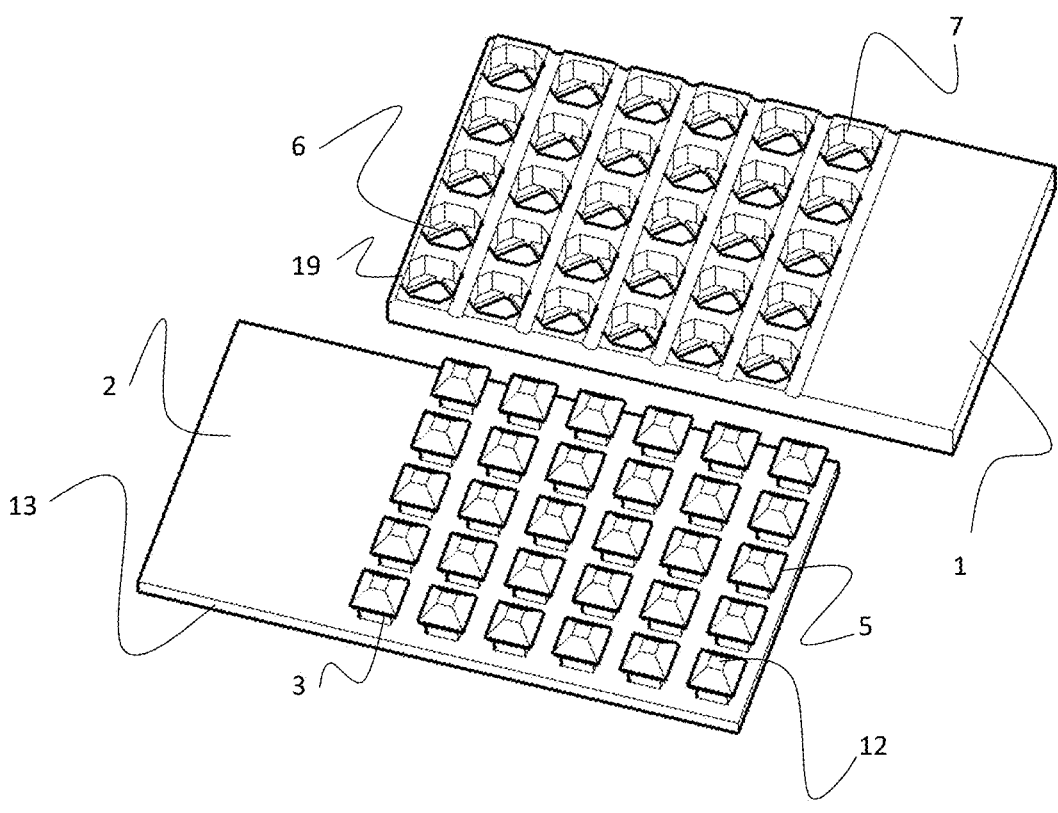
FIG. 1A: A perspective view of the first and second click elements aligned on top of each other so that they can be clicked together.

1. Second click element with recesses and ribs at the bottom
2. First click element with pins, wherein the pins have at least one set of lips
3. Single-lip pin: the description refers to a pin with one set of lips
4. Double-lip pin: the description refers to a pin with two sets of lips 5. Lip: this is the protrusion on the pin that preferably connects to the ribs of the corresponding click element. This serves the function of anchoring segments 6. Rib: this is the protrusion in the recess of the second click element that serves the function of anchoring segments 7. Recess within the second click element 8. Second click element with recesses and ribs in the middle of the recesses 9. Eye: this is an extra opening in the base 10. Adhesive strip: a strip or patch to attach the first and/or second element to a surface 11. Handle: a means to separate the first click element from the second click element 12. Top: this is the top of the pin that is preferably oblique and/or rounded in shape 13. Base plate: this is the plate of the click elements on which the pins are provided 14. Gutter: a recess or groove designed to provide the second click element with increased flexibility 15. V-groove: a cutout or groove in the middle of the recesses of the second click element 16. Pin with extra cutouts in the base plate and cross-shaped base 17. Hook-shaped pin with cutouts in the base plate 18. Second click element with extra cutout for hook 19. Recess wall: the edges of the recesses 20. Recess plate: the base plate of the second element equipped with recesses 21. Strap: a combination of the first and second click elements 22. Hook cutout 23. Base Cutout 24. Base portion of the pin 25. Second click element with recesses and barbed ribs at the bottom 26. Barbed rib 27. First click element with pins, wherein the pins have a set of two barbed lips 28. Barbed lip 29. Excision 30. Upward-facing rib 31. Downward-facing rib 32. Click element with recesses and ribs in the middle of the recesses combined with pins 33. Double-sided rib 34. Mobile phone cover 35. Shoe strap 36. Connector 37. Base element 38. End stop 39. Bracket 40. Fixing eyelet 41. Cable binder 42. Element with double pins 43. Button 44. Pin with asymmetrically arranged barbs 45. Click element with pins long side 46. Click element with pins short side 47. Click element with recesses and ribs arranged opposite each other 48. Inner flank of the recess wall 49. Flank of the pin 50. Inner flank of the tooth 51. Tooth of the pin 52. Positioner 53. Base plate of the cover 54. Raised edge of the cover 55. Dovetail joint 56. Fixed buttons 57. Loose buttons 58. Raised edge of the base plate 59. Inner layer 60. Outer layer 61. Clamp edge 62. Mobile phone cover with integrated buttons.

63. Mobile phone cover with loose and replaceable buttons

64. Multifunctional strap

Advantages

The present invention is mainly a competitor for the hook-and-loop connection and, more specifically, for the version known under the Velcro brand name.

It has the following advantages:

Minimal noise: Unlike the traditional hook-and-loop connection, where loosening the joint causes significant noise due to pulling the hooks from the loops, the present invention does not produce such noise.

Washable and hygienic: with the traditional hook-and-loop connection, dirt sticks to the hooks, and dirt creeps into the loops. In the execution of the present invention, no dirt sticks, and it is also very easy to clean, both manually and mechanically. The click elements can also be disinfected easily, making them suitable for use in the food and medical sectors as well as in swimming pools, playgrounds, hospitals, etc.

Environmentally friendly: the click elements can be constructed from a single material, which can be an environmentally friendly substance such as bioplastic. This not only makes the click elements environmentally friendly but also relatively inexpensive to produce.

Adaptable: with most versions made of plastic, it is also possible to cut and/or cut the click elements to size.

High forces: the specific structure of the click elements allows them to absorb much higher lateral forces than the traditional hook-and-loop connection. This makes the present invention suitable for heavier transport and vehicles and for more extreme applications.

Glueable: since the click elements in most cases do not contain a woven fabric, they can also be glued together.

Cheaper production: The simple construction of the click elements results in a much lower production cost compared to the traditional hook-and-loop connection, especially in the versions where the opposite click elements are identical or nearly identical.

Reliability: in the traditional hook-and-loop connection, hooks regularly break off after multiple uses. This issue does not occur with the present invention.

Underwater applications: the technique of this invention enables the click elements to be used underwater, even in liquids that are heavily contaminated and/or have high viscosity. When the two elements are compressed, the fluid between the ribs is pushed away and can escape through the openings of the recesses.

Additional advantages include that most versions, according to the current invention, do not immediately stick. Therefore, it does not hurt to touch the pins or walk over them and they do not stick to clothes if washed together, for example.

This invention's key characteristic lies in the fact that its individual components demand less force for compression than the force required for their separation.

An advantage is that the back of the cover includes a provision for easily attaching various accessories.

The level of adhesion can be adjusted by varying the ratio between the pin and the receiving part, depending on the requirements of the specific application.

In the case of the multifunctional strap combined with the cover, the benefit is that the multifunctional strap can be configured for different use cases depending on its positioning or setup.

DETAILED DESCRIPTION OF THE INVENTION

Unless otherwise defined, all terms used in the description of the invention, including technical and scientific terms, have the meaning generally understood by those skilled in the technical field of the invention. For a better assessment of the description of the invention, the following terms are explicitly explained.

As used herein, the following terms have the following meanings:

"A(n)", "the" and "it" as used herein refer to both singular and plural unless the context clearly assumes otherwise. For example, "a product" means one or more products.

"Approximately" as used herein, referring to a measurable value such as a parameter, a quantity, a duration and the like, is intended to include variations of +/−20% or less, preferably +/−10% or less, more preferably +/−5% or less, even more preferably +/−1% or less, and still even more preferably +/−0.1% or less than any of the quoted values, insofar as such variations are applicable in the disclosed invention. However, this should be understood to mean that the value of the quantity for which the term "approximately" is used is itself specifically disclosed.

"Include", "encompass" and "consist of" and "consisting of" as used herein are synonymous with "contain", "containing", "encompass" or "encompassing", "include", "including" and are inclusive or open-ended terms denoting the presence of what follows, and do not exclude or preclude the presence of other components, features, elements, members, steps, known from or described in the prior art.

Furthermore, the terms first, second, third and the like are used in the description and claims to distinguish between similar elements and not necessarily to describe a sequential or chronological order, unless otherwise indicated. It should be understood here that the terms so used are interchangeable under appropriate circumstances and that the embodiments of the invention disclosed herein may be used in sequences other than those disclosed or illustrated herein. Quoting numeric intervals by endpoints includes all numbers and fractions within that range, including the quoted endpoints.

While the terms "one or more" or "at least one", such as one or more or at least one member(s) of a group of members, are in themselves clear, but for further illustration, the term includes a reference to one of said members, or to two or more of said members, such as, for example, 3, 4, 5, 6 or 7 etc. of said members, and to all said members.

All references cited in the present application are hereby incorporated by reference in their entirety. In particular, the teachings of all references specifically referred to herein are incorporated by reference.

Reference in this specification to "one embodiment" or "an embodiment" means that a particular feature, structure or property is included in at least one embodiment of the present invention. This means that the appearance of the expressions "in one embodiment" or "in an embodiment" in different places in this application does not necessarily all refer to the same embodiment, but they may.

Moreover, the specific features, structures or properties may be combined in any suitable manner, as would be apparent to one skilled in the art from this description, in one or more embodiments. Moreover, some embodiments disclosed herein include some, but not other features included in other embodiments and combinations of features of different embodiments intended to fall within the scope of the invention, thus forming other embodiments, as would be understood by those skilled in the art. For example, in the following claims, any of the listed embodiments may be used in any combination.

For example, in the subsequent claims, any of the claimed embodiments may be utilized in any combination.

The terms "first click element" and "second click element" refer to two types of click elements.

When employing the x, y, and z-axes as references, for example, where the clicked element is positioned horizontally, the x-direction is identified as the horizontal longitudinal direction, which is the direction in which the forces are applied. The y-direction represents the width in the horizontal orientation of the click element, and the z-axis denotes the vertical direction in which the click elements are moved towards or away from each other.

When defining the parts, such as the pins, gradients can be used to determine the shape of the pins according to the z-direction. These gradients range preferably from 0° to 1°, but can also range from 1° to 3°, with possibilities up to 5°, and depending on the implementation or combination, cutouts and protrusions of the pins, the shape of the pins themselves or a combination of shapes and/or different materials of pins, as well as the slope of the pins can be ≥5° and the gradients can even be negative.

When defining the composition of the click elements wherein the arrangement of the pins of one element in relation to the location of the ribs in the recesses of the other element is determined, it is preferably 45° but can also be larger than 45°. Depending on the design and/or composition of the elements, the shape of the pins or recesses themselves, or a combination of shapes and/or different materials of pins and/or recess plates, the rotation difference between them can range from 0 to 180°.

The foundation of the invention is the principle whereby a first element 2 equipped with pins is clicked into a second element 1 equipped with recesses 7, and where recesses 7 are equipped with clamping means designed to clamp the pins of the first element 2 with a specific force. During the application of the two elements, the second element 1 and the first element 2, a certain force must be applied.

Figure 1B:
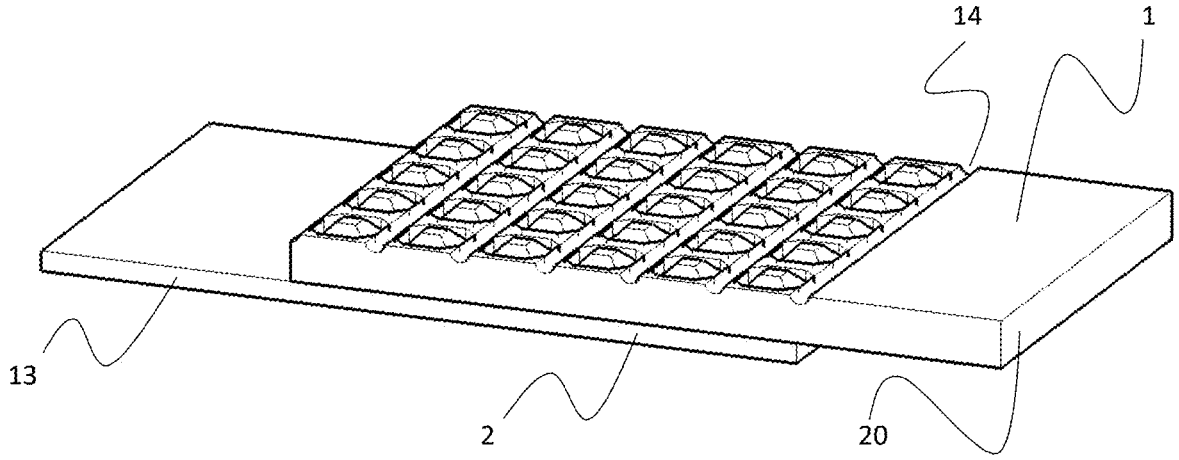
FIG. 1B: iA perspective depicting the first and second click elements clicked together.
Figure 2A:
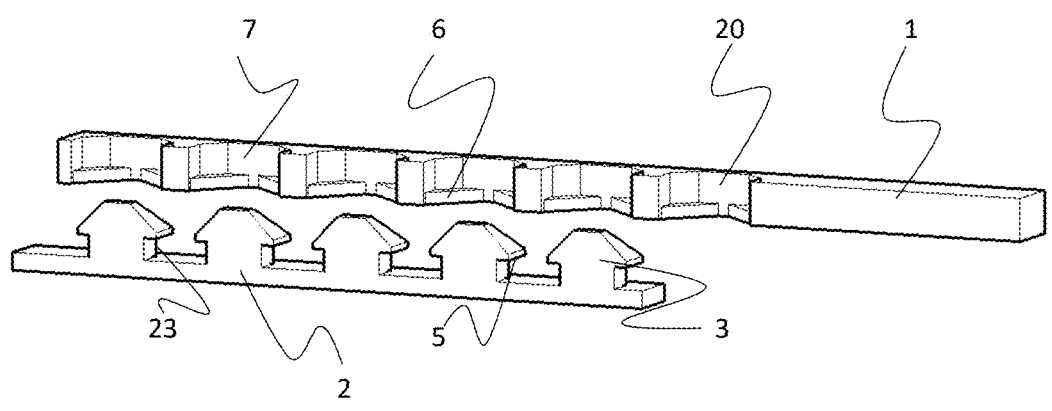
FIG. 2A: A perspective cross-sectional view of the first and second click elements aligned on top of each other so that they can be clicked together. The ribs of the second click element are positioned at the bottom of the recess.
Figure 2B:
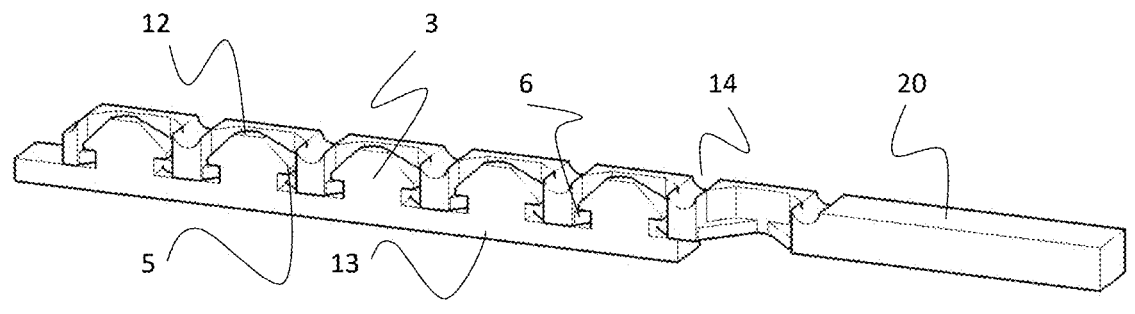
FIG. 2B: A perspective cross-sectional view of the first and second click elements clicked together. The ribs of the second click element are positioned at the bottom of the recess.

The general principle is illustrated in FIG. 1 and FIG. 2, where second element 1 is equipped with multiple recesses 7 arranged in a specific pattern, and the ribs 6 are positioned at the bottom of these recesses 7. The walls 19 are equipped with gutters 14, making the recess plate 20 more flexible. The first element 2 is equipped with single-lip pins 3 on the base plate 13 arranged according to the same pattern as in the second element 1. When the second element 1 is clicked together with the first element 2, the lip 5 of the single-lip pin 3 will hook behind the rib 6 of the second element 1. To push them together, a certain force is needed that is basically less than the force needed to pull the first element 2 elements apart according to the z-direction. As a result of this configuration, the tensile force that can be exerted in the x- or y-direction or in other words in the transverse direction is very high, especially compared to similar existing clamping systems. The top 12 of the single-lip pins 3 is point-shaped to make it easier for the user to position the single-lip pin 3 in front of the recess 7, enabling the two elements to be clicked together more easily. In FIG. 2A and FIG. 2B, this principle is further illustrated. These figures are cross-sections of the second element 1 and the first element 2, where, according to FIGS. 1A and 2B, it is clear that the lip 5 is formed by the cutout 23 in the single-lip pin 3, and the rib 6, which is located at the bottom of the recess 7, fit into the cutout 23 of the single-lip pin 3, when second elements 1 and 2 are clicked together.

Figure 3:
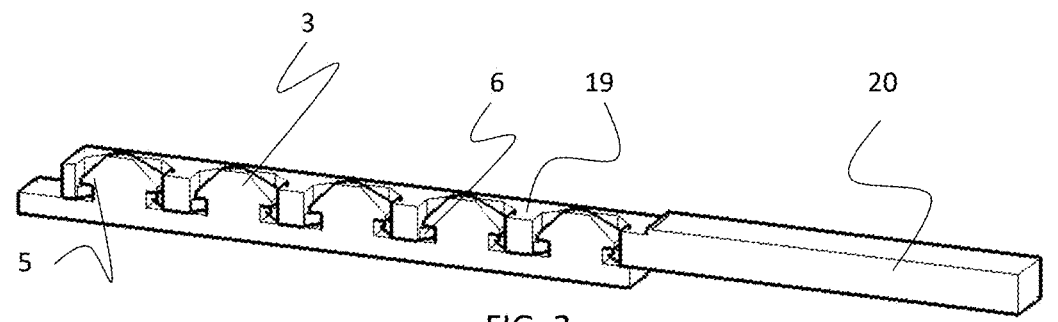
FIG. 3: A perspective cross-sectional view of the first and second click elements clicked together. In this case, the ribs of the second click element are positioned at the bottom of the recess, and the walls of the second click element are shorter than the pins of the first click element.
Figure 4:
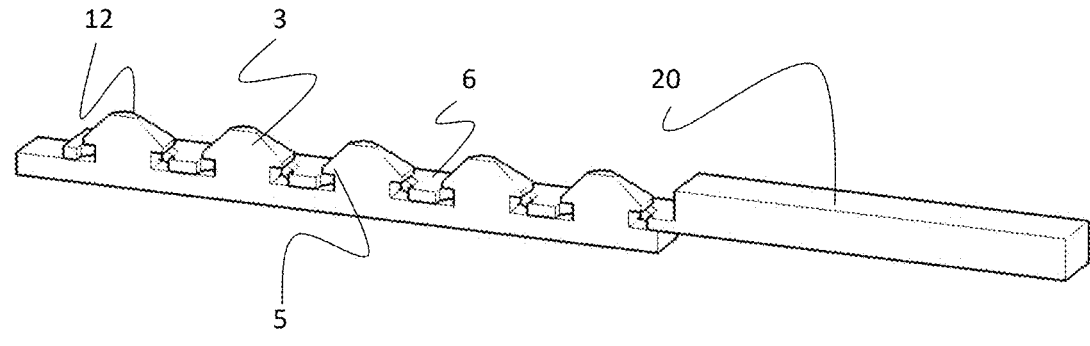
FIG. 4: A perspective cross-sectional view of the first and second click elements clicked together. In this case, the ribs of the second click element are positioned at the bottom of the recess, and the walls of the second click element have the same height as the ribs.

In the previous descriptions, several variants are possible as shown in FIG. 3 and FIG. 4 where the setup in FIG. 3 illustrates a first element 2 where the wall 19 is lower than the height of the single-lip pin 3 and in FIG. 4 a setup is shown where the wall 19 has the same height as the height of rib 6 of recess plate 20.

Figure 5A:
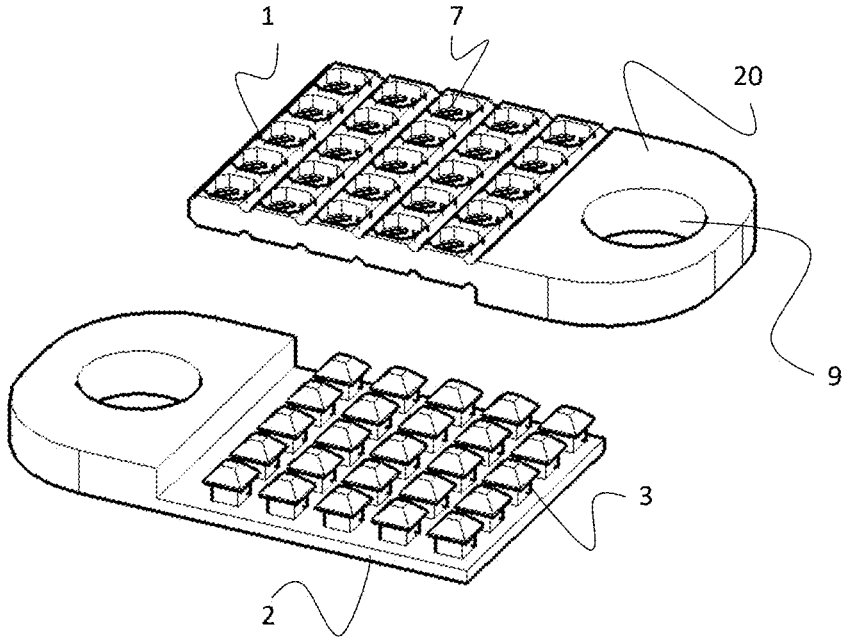
FIG. 5A: A perspective view of the first and second click elements in a button design positioned on top of each other so they can be clicked together.
Figure 5B:
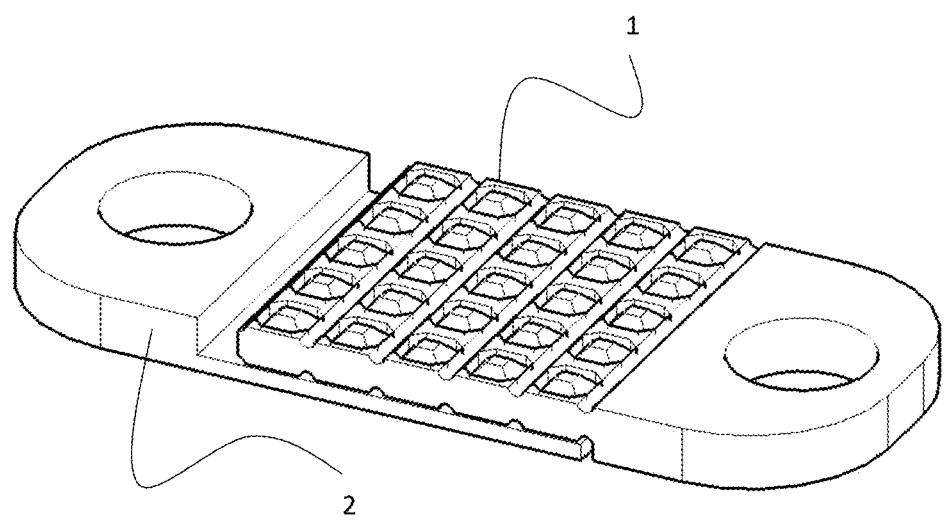
FIG. 5B: A perspective view of the first and second click elements clicked together in a button design.

The technique of the present invention lends itself to certain versions, for example, according to FIGS. 5A and 5B, a click connection can be provided whereby the second element 1 and the first element 2 are equipped with an eye 9, allowing different parts to be connected to each other in a simple way.

Figure 6A:
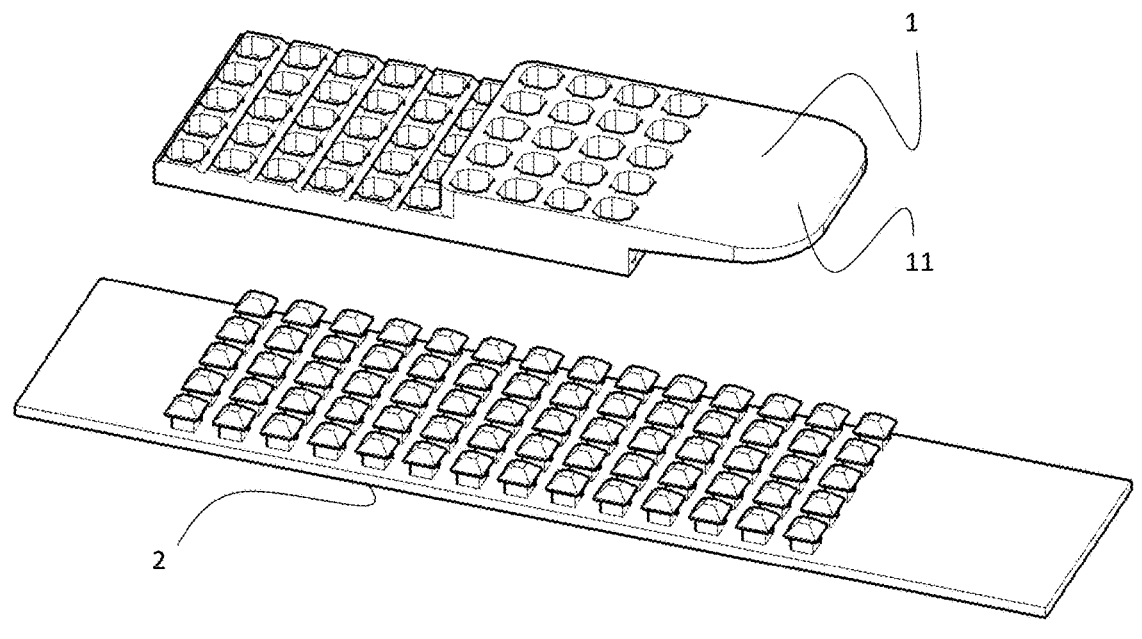
FIG. 6A: A perspective view of the first and second click elements positioned on top of each other so that they can be clicked together in a design where the second click element can be clicked onto the first element at any location and where the two elements can be separated from each other using a handle.
Figure 6B:
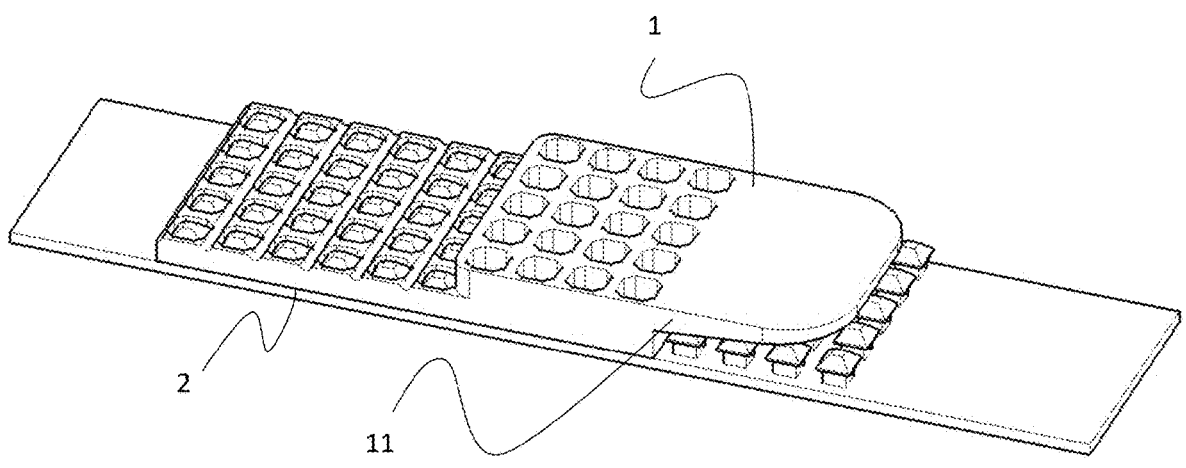
FIG. 6B: A perspective view of the first and second click elements clicked together in a design where the second click element can be clicked onto the first element at any location and a handle is provided to separate the two elements.

Another version is shown in FIGS. 6A and 6B, where the elements are executed in strips and the two elements can be connected to each other at random places. To facilitate the separation of the two elements, at least one of the elements can be equipped with a handle 11. In the version shown in FIGS. 6A and 6B, the second element 1 features a handle 11. Part of the wall 19 of the recess plate 20 is raised.

Figure 7A:
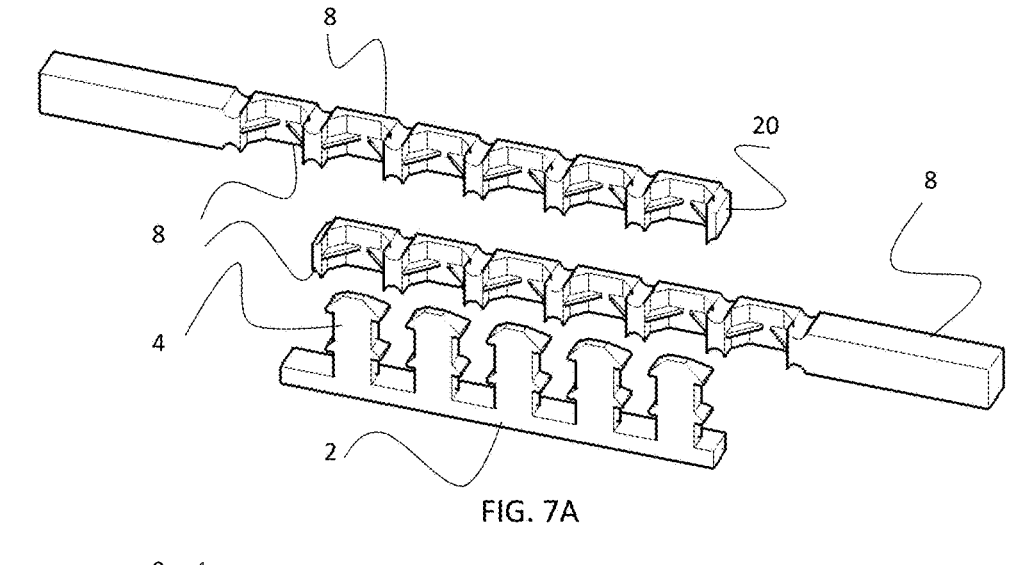
FIG. 7A: A perspective cross-sectional view of the first click element equipped with pins with a double row of lips and two click elements with recesses where the ribs are positioned in the middle. The click elements are positioned on top of each other so that they can be clicked together.
Figure 7B:
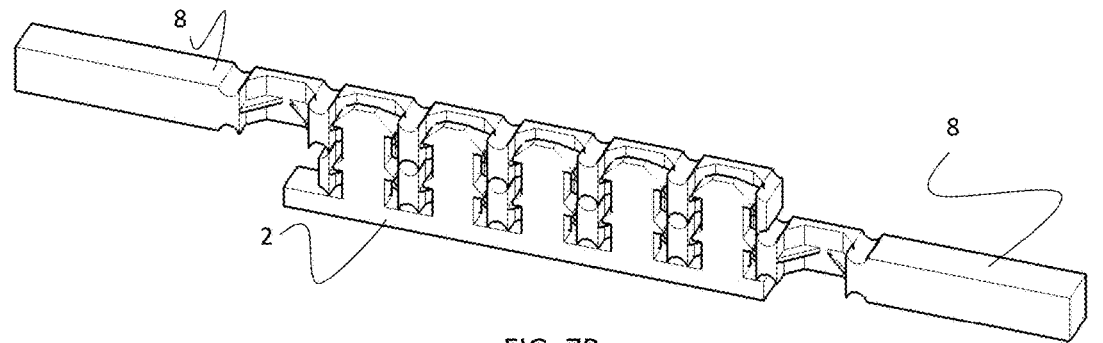
FIG. 7B: A perspective cross-sectional view of the first click element equipped with pins with a double row of lips and two click elements with recesses where the ribs are positioned in the middle. The various click elements are clicked together.

Another variant is shown in FIGS. 7A and 7B, where the rib 6 is positioned in the middle of the recess plate 20, allowing the second element 8 to be used bilaterally. If the first element 2 is equipped with double lip pins 4 that are tall enough, it is possible to attach two second elements 8 to the same first element 2, forming a double connection.

Figure 8:
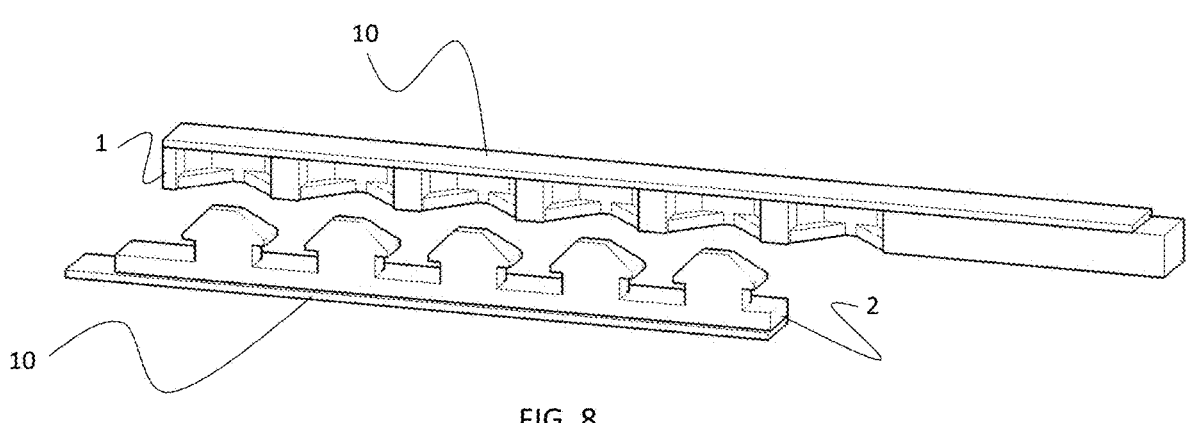
FIG. 8: A perspective cross-sectional view of the first and second click elements on top of each other in a position so that they can be clicked together. The ribs of the second click element are positioned at the bottom of the recess. The two elements are equipped with an adhesive strip.

In certain applications, it is desirable for the two elements to be glued. In the versions shown in FIG. 8, both the second element 1 and the first element 2 are equipped with an adhesive strip 10 allowing the elements to be glued to a surface.

Figure 9:
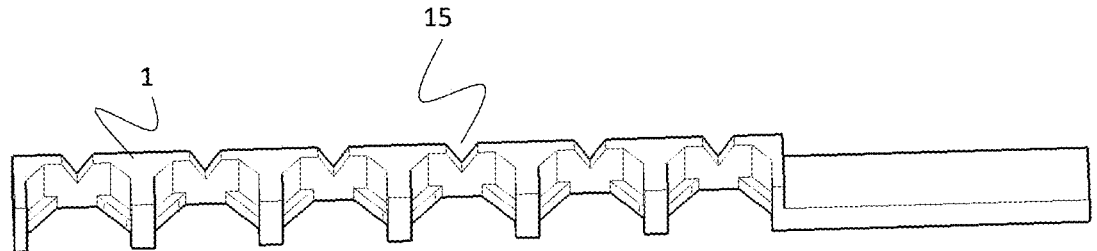
FIG. 9: A perspective cross-sectional view of the second click element in which the ribs of the second click element are positioned at the bottom of the recess, and the recess is equipped with an additional V-groove.

Flexible applications are possible when using soft or semi-soft materials as the basis for the second element 1 and the first element 2. To increase the flexibility of the second element 1, a V-groove 15 can be applied tin the middle of the wall 19 of the recess 7 as shown in FIG. 9.

Figure 10:
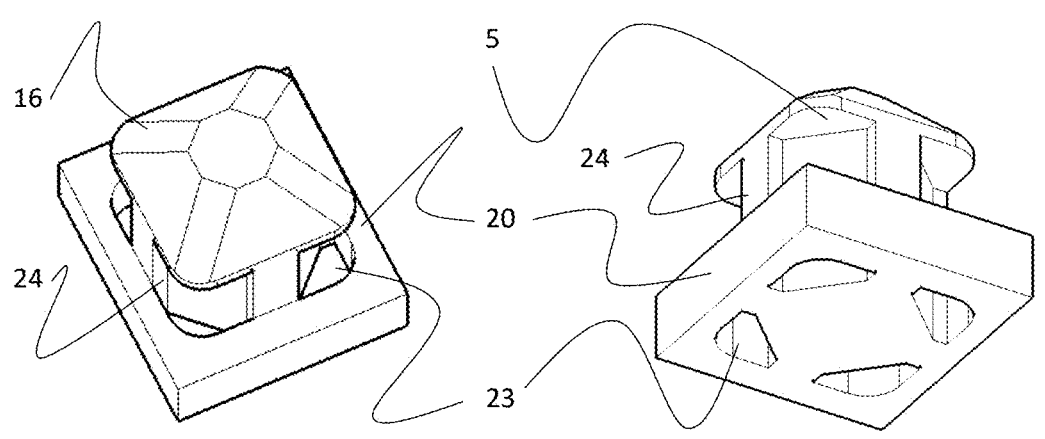
FIG. 10: A perspective view of a pin where the base is cruciform and the bottom plate features recesses.

When using square-shaped pins, the lip 5 is particularly important, which is formed by the corners of the single-lip pin 16. To facilitate the production of this single-lip pin 16 and in some cases, to make it possible, the cutout 23 under the single-lip pin 16 is extended by the recess plate 20. In production, the production jigs can be fitted with pins that extend along the bottom to the bottom of the lip 5 and can therefore form the cutout 23 of the single-lip pin 3, thus forming a cross-shaped base 24 as shown in FIG. 10.

Figure 11:
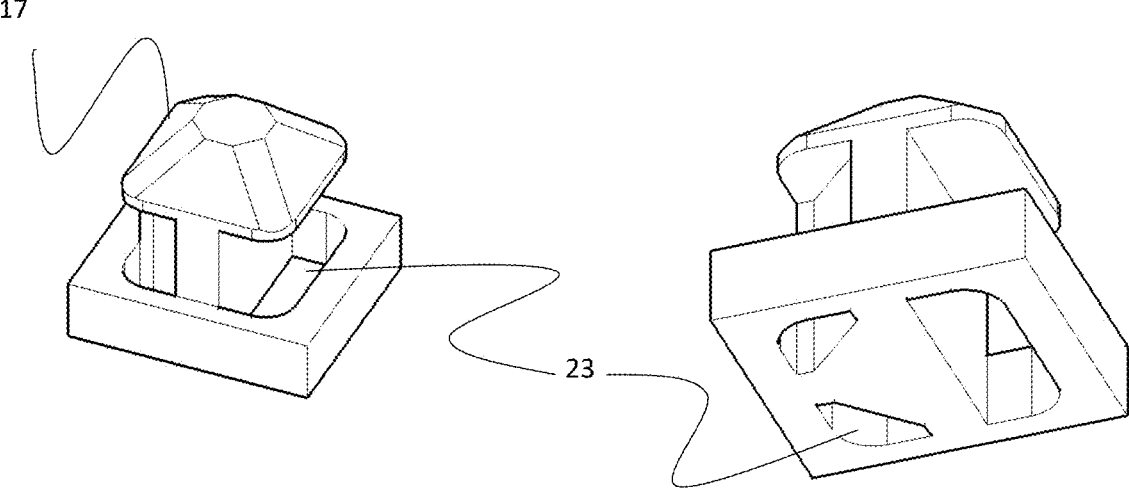
FIG. 11: A perspective view of a hook-shaped pin with the bottom plate featuring recesses.

A variant of the above version is shown in FIG. 11 and features a hook-shaped pin 17. The function is essentially the same as the single-lip pin 3, but with the added function that the hook shape allows the hook-shaped pin 17 to latch onto something, such as an extra space in the wall 19 at the recess plate 20.

Figure 12A:
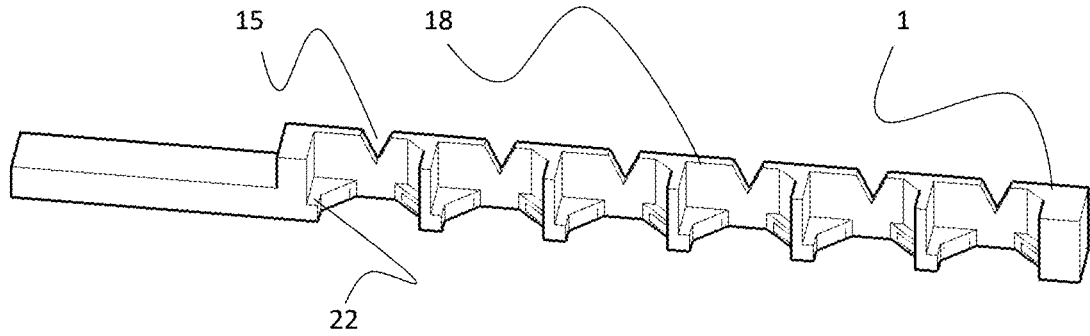
FIG. 12A: A perspective cross-sectional view of the second click element where the ribs of the second click element are positioned at the bottom of the recess, and the recess is equipped with an additional cutout to accommodate the hook-shaped protrusion of the hook-shaped pin.
Figure 12B:
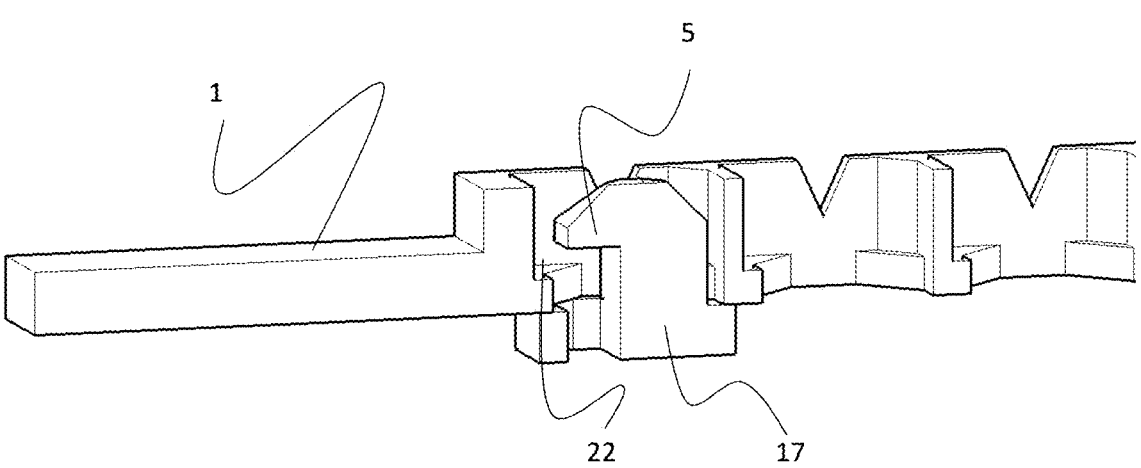
FIG. 12B: A perspective cross-sectional view of the first and second click elements where the ribs of the second click element are positioned at the bottom of the recess, and the hook-shaped pin is positioned in the recess.

FIGS. 12A and 12B depict a version where a hook cutout 22 is provided in the wall 19 of the recess plate 20, allowing, when a force is applied in the x- or y-direction, to push the hook-shaped pin 17, into the cutout 22.

By combining the second element 1 and the first element 2 into a single piece, a strap 21 with a fastening piece can be formed as shown in the FIGS. 13A and 13 B. A strap 21 is a combination of recesses 7 of the second element and the single-lip pins 3 of the first element. By folding these, the single-lip pin 3 can be positioned in the recess 7 and this combination forms a bracelet-like application. To facilitate the placement of the second element 1 on the first element 2 in this combination, part of the bottom of the recess 7 can be equipped with the extra cutout 23.

Figure 14A:
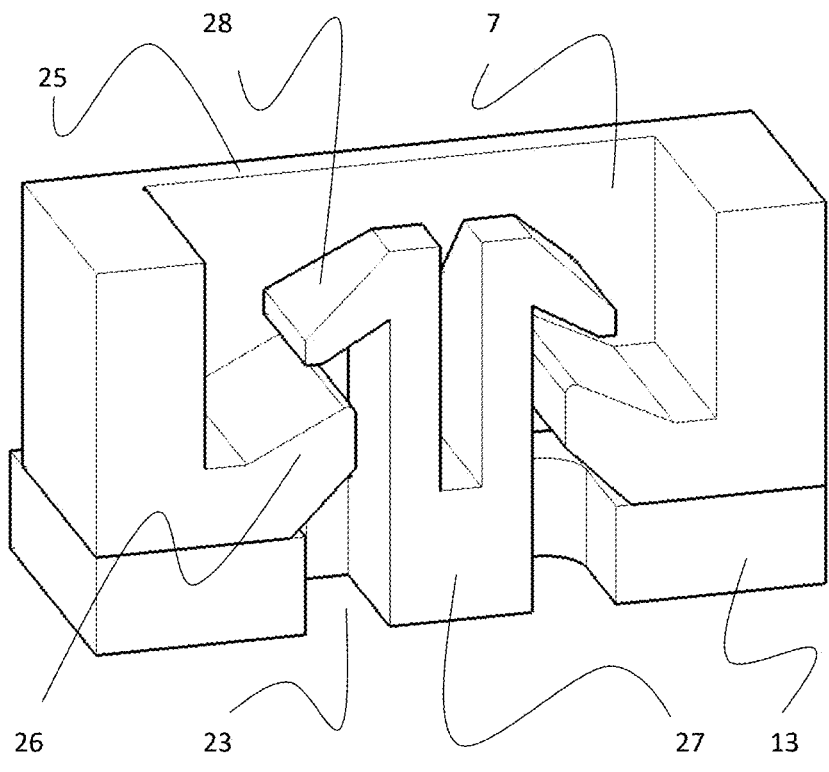
FIG. 14A: A perspective cross-sectional view of a barbed pin where the base is rectangular, and the base plate features recesses in combination with a second click element with recesses and barbed rib at the bottom.
Figure 14B:
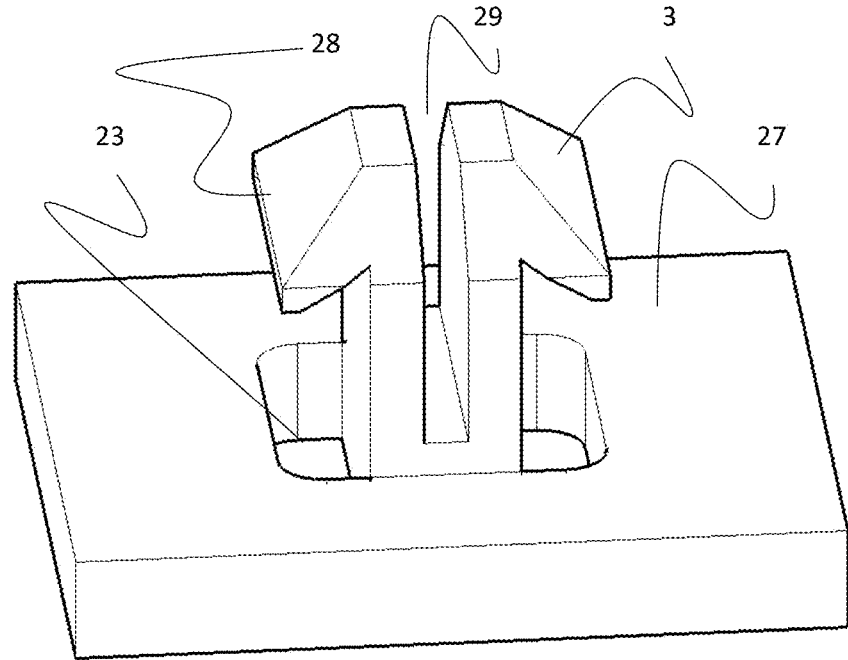
FIG. 14B: A perspective view of a barbed pin where the base is rectangular, and the base plate features recesses.
Figures 14C, 15:
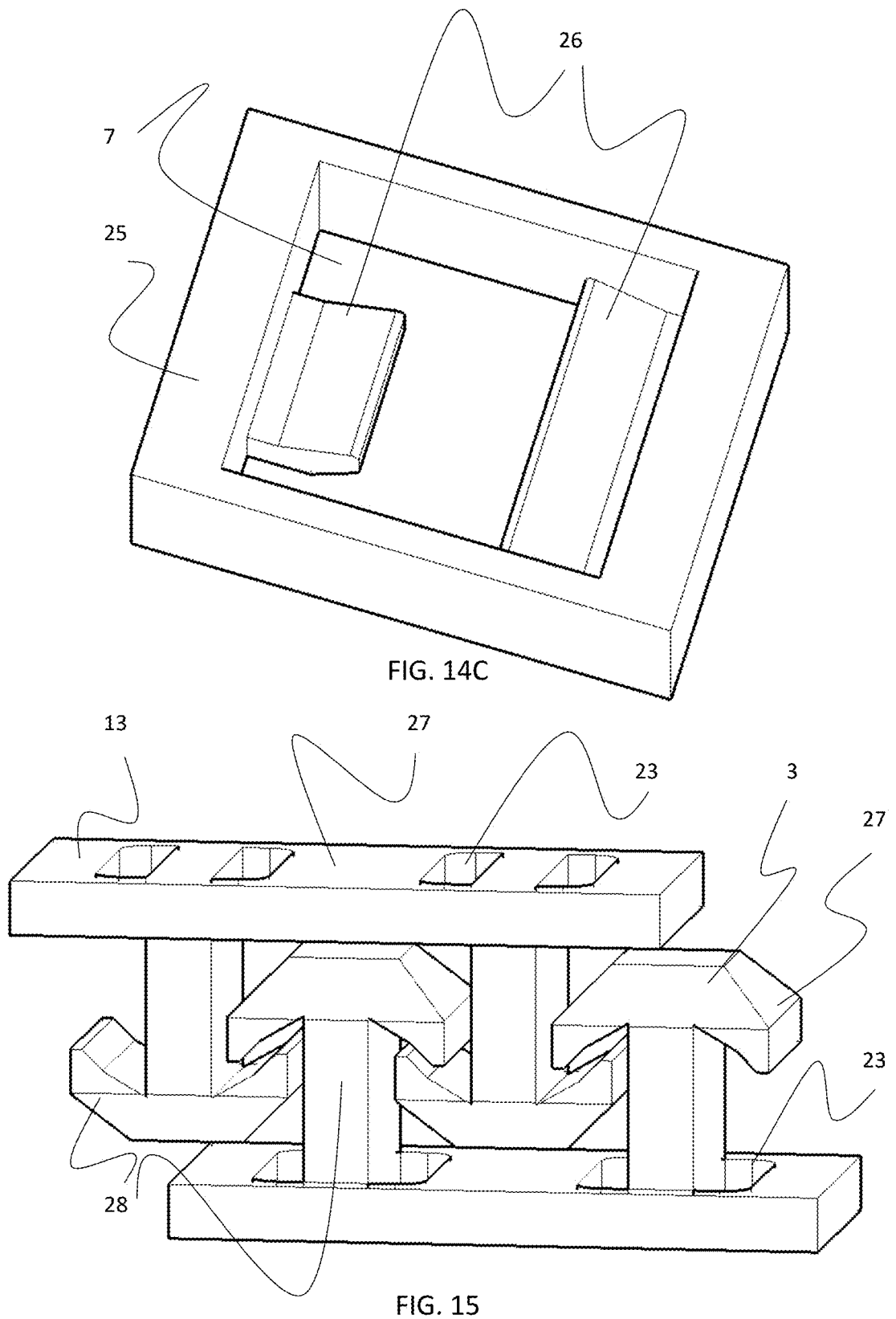
FIG. 14C: A perspective view of a second click element with recesses and barbed rib at the bottom.
FIG. 15: A perspective view of a combination of two first click elements with pins, wherein the pins have a set of two barbed lips.
Figure 16:
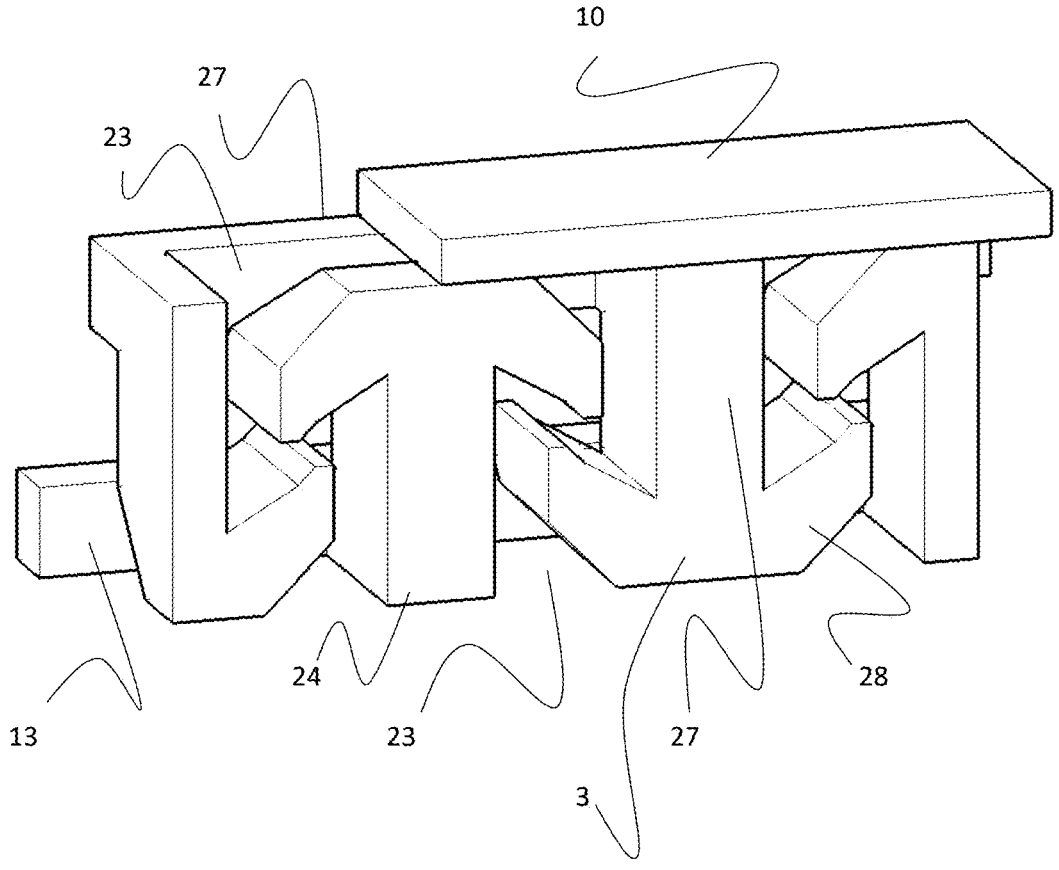
FIG. 16: A perspective cross-sectional view of a combination of two first click elements with pins, wherein the pins have a set of two barbed lips wherein an opening is provided in the base plate between the bases of the pins.

A possible additional version is shown in FIGS. 14A, B and C where the first click element with barbed pins 27 is equipped with barbed hooks that hook behind the barbed ribs 26 of the second click element 25 when the two click elements click together. An additional option is that the pins with barbed lips 28 are equipped with an excision 29 to support the operation of the barbed lips 28. The barbs on both, the barbed ribs of the recesses 26 and the barbed lips 28 of the pins, are intended to snap the two click elements together with less force than is necessary to pull them apart. As shown in FIG. 14C, the ribs 26, which may or may not be barbed, can extend over the entire width or part of the recess 7. If the barbed rib 26 does not run the entire length of the recess 7, it is preferably located in the middle of the recess 7. According to a preferred embodiment, the shape of the recess 7 is rectangular, with the length longer in the direction of the barbed ribs 26 than the width, allowing the pin of the first click element 27 to move in a longitudinal direction parallel to the direction of the barbed ribs 26. This has the advantage that the combination of the two click elements can also take on a curved shape. Another possibility is that two first click elements 27 are combined as shown in FIG. 15. In this case, the barbs of the barbed lips 28 hook one after the other and the operation is similar to that of a combination of a first click element 27 and a second click element 25. FIG. 16 shows a similar arrangement as in FIG. 15 but with the difference that the cutouts 23 in the base plate 13 of the first click element 27 are continuous from the base portion 24 of the pin 3 to the base portion 24 of the adjacent pin 3 and that this cutout 23 is large enough to receive the pin 3 of the receiving first click element 24. Preferably, at least one of the first click elements 27 is provided with an adhesive strip 10.

Figure 17:
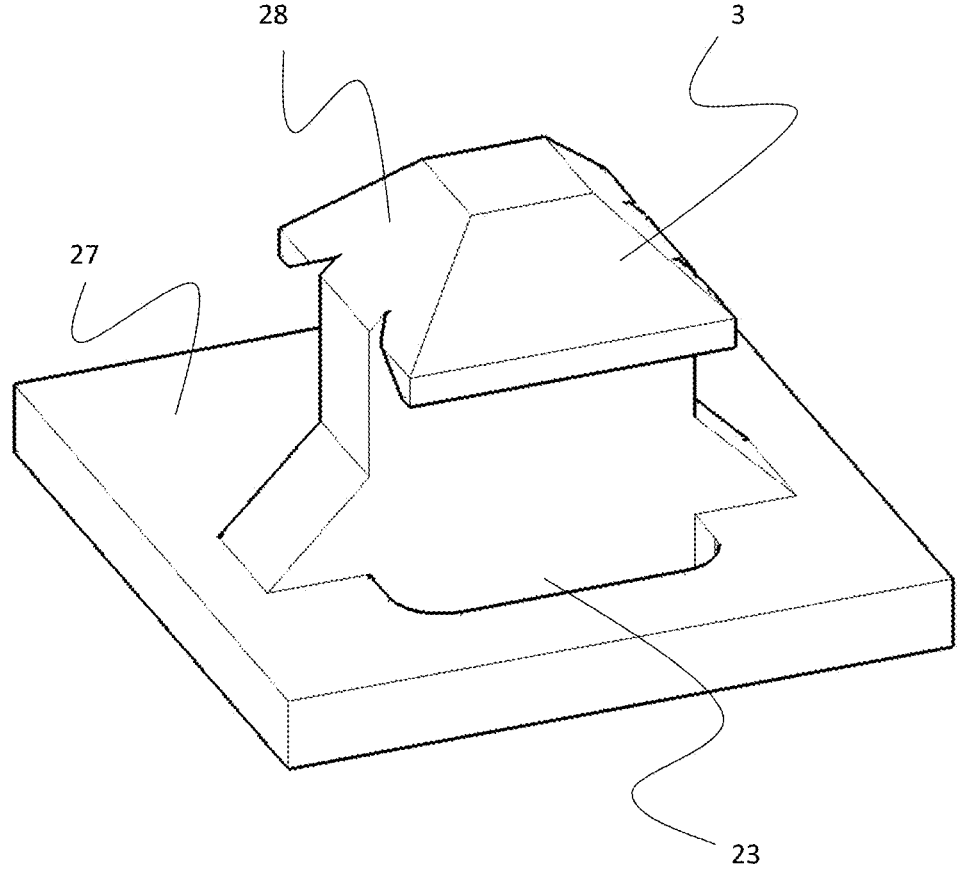
FIG. 17: A perspective view of a barbed pin where the base is rectangular, and the base plate features recesses.

The single-lip pin 3 as provided on the first click element 27 as shown in FIG. 17 features a widening in the base to reinforce the pin 3. The purpose of this is to prevent the pin 3 from tearing off when removing pin 3 from the second click element.

Figure 18A:
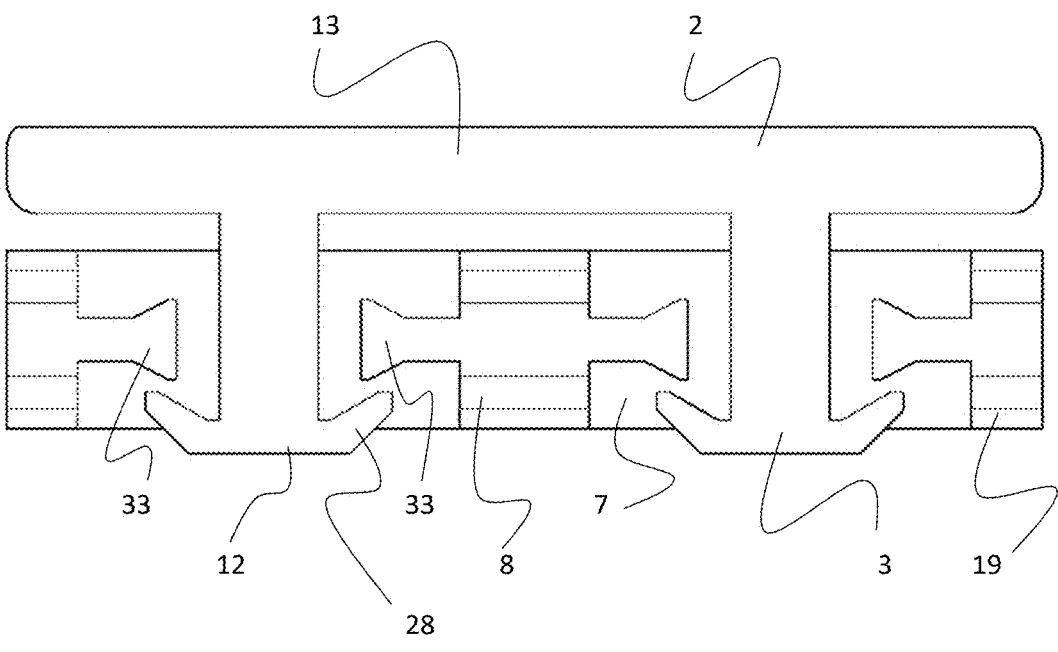
FIG. 18*a*: A cross-sectional side view depicting the combination of a first click element with pins and a second click element featuring recesses. The recesses contain centrally placed ribs, equipped with double-sided barbs.
Figure 18B:
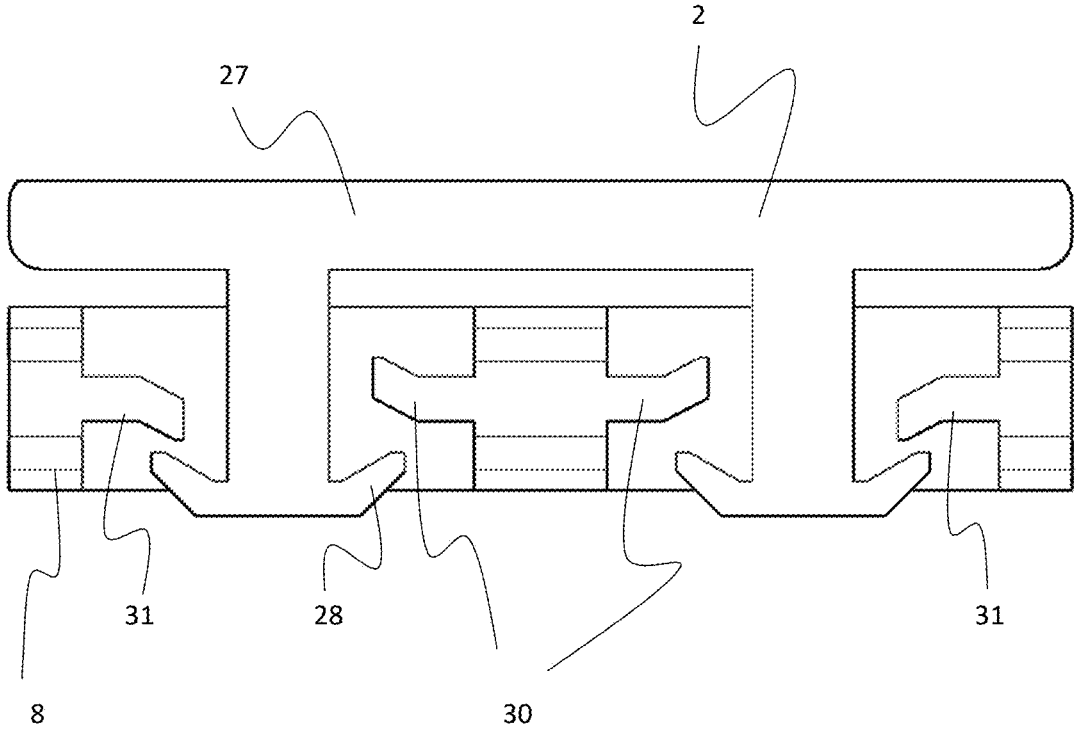
FIG. 18*b*: A cross-sectional lateral view illustrating the combination of a first click element with pins and a second click element with recesses. The recesses have centrally positioned ribs, each containing barbs that point in different directions within the same recess.

An additional version of the combination of two click elements is shown in FIGS. 18a and 18 b, wherein the first click element with pins 2 in the second click element with recesses and ribs in the middle of the recesses 8, clicks along two sides. In the version as shown in FIG. 18a, this is possible because the second click element with recesses and ribs in the middle of the recesses 8 is equipped with a double sided rib 33 so that the barbed lip 28 of the single-lip pin 3 of the first click element with pins 2 gets caught on second click element with recesses and ribs in the middle of the recesses 8 behind the barbs of the rib 6 when mounted and this on two sides. The version as shown in FIG. 18b has the same effect but features recesses with a combination of centrally positioned upward-facing rib 30 and downward-facing rib 31.

Figure 19:
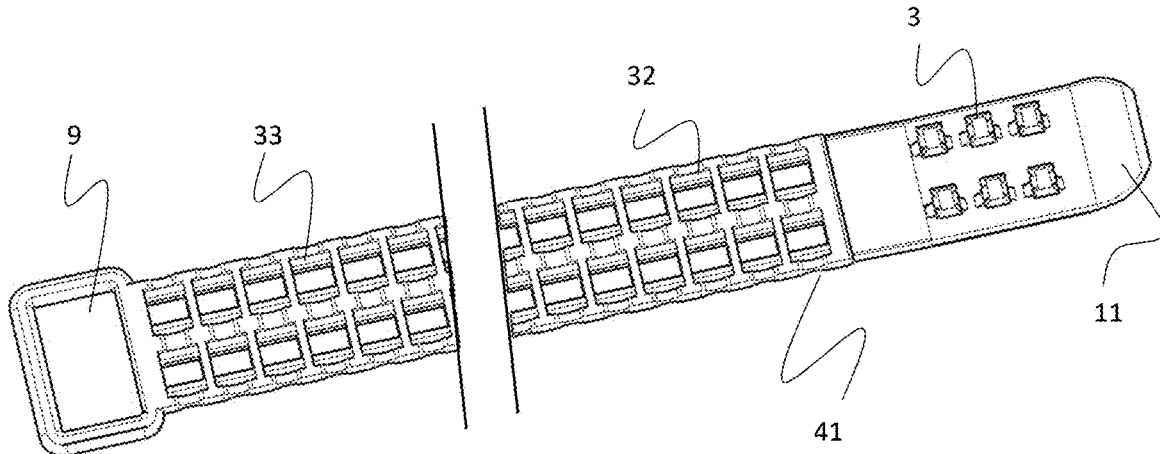
FIG. 19: A perspective view depicting a cable binder.

The technique as shown in FIG. 18a forms the basis for an execution such as a click element with recesses and ribs in the middle of the recesses combined with pins 32 so that e.g. a cable binder 41 can be configured as shown in FIG. 19.

In one piece, the combination is made of a click element with recesses 7 and ribs 6 in the middle of the recesses 7 combined with pins 32 with double-sided rib 33 supplemented with single-lip pin 3, a handle 11 and an eye 9. This cable binder 41 has the great advantage that it can be used in two ways.

A first way is a closure in which the single-lip pin 3 is pushed through the eye 9 with the single-lip pin 3 in the direction of the click element with recesses and ribs in the middle 32, and a closure is achieved by the single-lip pin 3 in the click element with recesses and ribs in the middle of the recesses 32.

A second way is a closure where the single-lip pin 3 is pushed through the eye 9 with the single-lip pin 3 in the direction away from the click element with recesses and ribs in the middle of the recesses 32, and then move the handle 11 back in the direction of the click element with recesses and ribs in the middle of the recesses 32 and then apply the single-lip pin 3 in the click element with recesses and ribs 32. This second form of closure has the advantage that the backward movement of the strap through the eye 9 ensures that the cable binder 41 can put the items it wants to bind under a higher tension.

Figure 20:
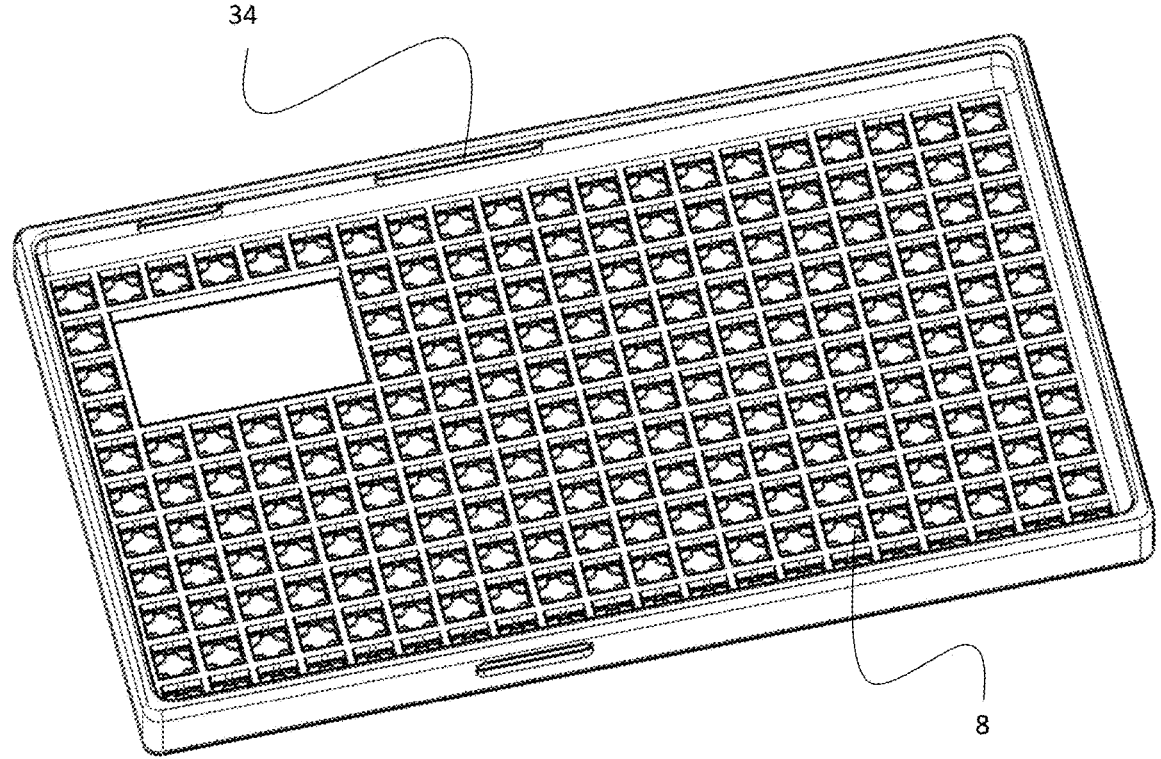
FIG. 20: A perspective view depicting a basic version of a mobile phone cover.

Another version that can be configured with the present invention is a mobile phone cover 34. The execution shown in FIG. 20 uses the technique shown in FIG. 9. This makes it possible to click accessories of all shapes, sizes and designs onto the mobile phone cover 34 by equipping these accessories with pins as described in the present invention without the need to remove the mobile phone cover 34 from the mobile phone.

The present invention makes various applications possible. It can be applied as a stand-alone product or integrated as a component into other products.

Figure 21:
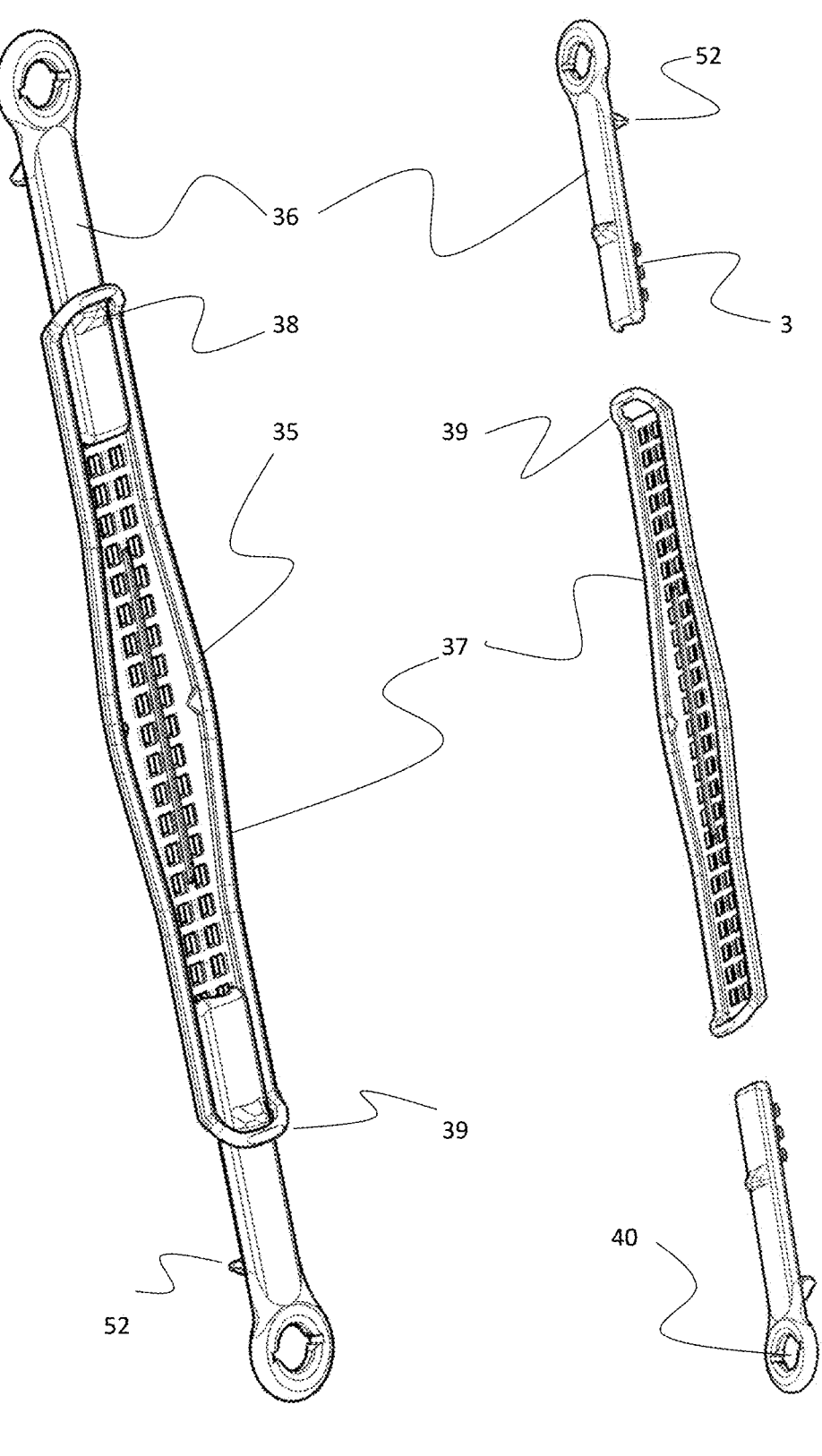
FIG. 21*a*: A perspective view of a mounted shoe strap.
FIG. 21*b*: A perspective view displaying the individual components of a shoe strap.

An example of a stand-alone product is the shoe strap 35 as shown in FIGS. 21a and 21b. FIG. 21a shows the shoe strap 35 in mounted design, and the FIG. 21b shows the different parts of the shoe strap 35. The second click element with recesses and barbed ribs at the bottom 25 is a version that is suitable for mounting on shoes such as the well-known Crocs or other similar shoes. The shoe strap 35 is made up of three parts, two connectors 36, and one base element 37. In this version, the base element 37 is made up of a composition such as a second click element with recesses and ribs at the bottom 1 in combination with a bracket 39. The connector 36 is equipped with single-lip pin 3, an end stop 38, a fixing eyelet 40, and a positioner 52. The fixing eyelet 40 connects to the shoe via the rivet on the shoe. The connector 36 can be placed in different places on the base element 37, making the shoe strap 35 adjustable in length. The connector 36 is also equipped with an end stop 38, in combination with the bracket 39, this ensures that the end stop 38 does not come loose completely if the connection between the connector 36 and the base element 37 via the single-lip pin 3 is unintentionally broken.

The connector 36 is also equipped with a positioner 52, this positioner 52 rests on the side of the shoe so that the shoe strap 35 remains in the required position and therefore does not sag.

Figure 22:
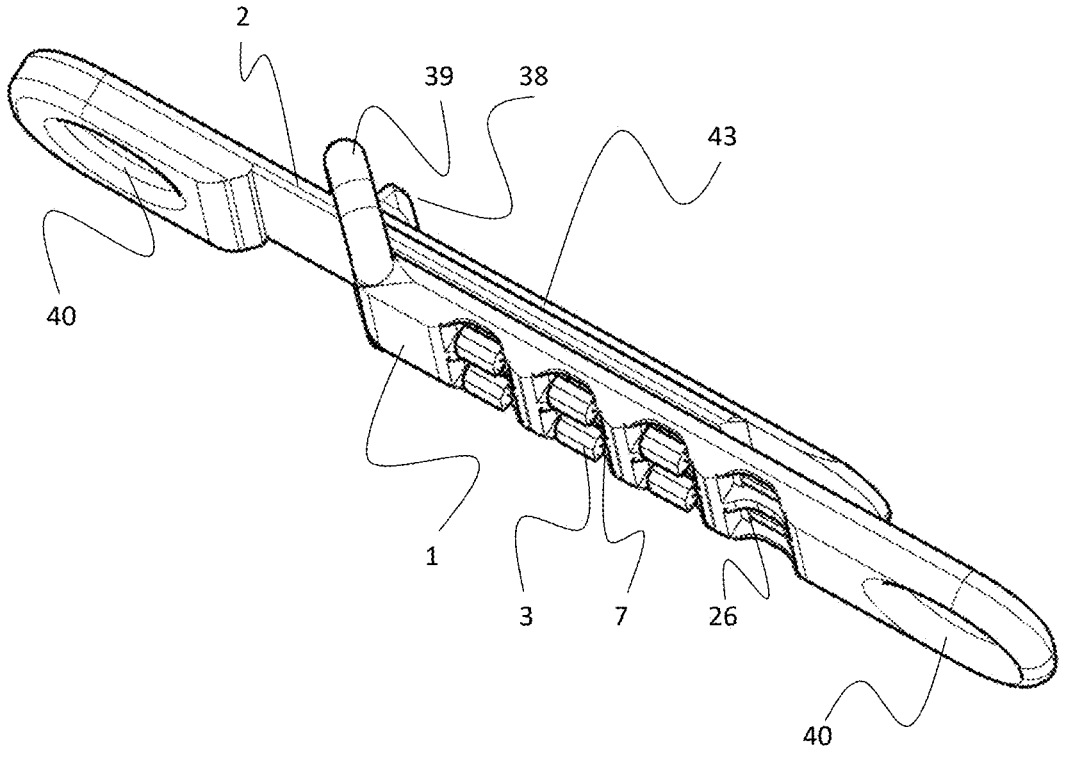
FIG. 22: A perspective view of a button equipped with security features.

An example of an execution where the technique can be used as part is the button 43 as shown in FIG. 22. This specific version is made up of two parts, the second click element with recesses and ribs at the bottom 1 with a bracket 39 and a fixing eyelet 40. The second part is built as a first click element with pins 2, a end stop 38, and a fixing eyelet 40. When placing the first click element with pins 2, wherein the pins have at least one set of lips 2 on the second click element with recesses and ribs at the bottom 1, the first click element with pins 2 is pushed through the bracket 39 at a certain angle to then insert the single-lip pin 3 of the second click element with recesses and ribs at the bottom 1 above the corresponding recess within the second click element 7 and then compress it. If the second click element with recesses and ribs at the bottom 1 would be released from the first click element with pins 2, wherein the pins have at least one set of lips 2, the end stop 38 ensures that the parts connected by the fixing eyelet 40 of the second click element with recesses and ribs at the bottom 1 and the first click element with pins 2 are not released uncontrollably. As soon as there is no connection between the two parts via the single-lip pin 3, the end stop 38 hooks behind the bracket 39.

Sometimes it is necessary that the connections between the second click element with recesses and ribs at the bottom 1 and first click element with pins 2, wherein the pins have at least one set of lips 2 are given extra protection against pulling off, as with safety vests. A solution to this is shown in FIGS. 23a, 23b, 23c, 24a and 24b.

Figure 23A:
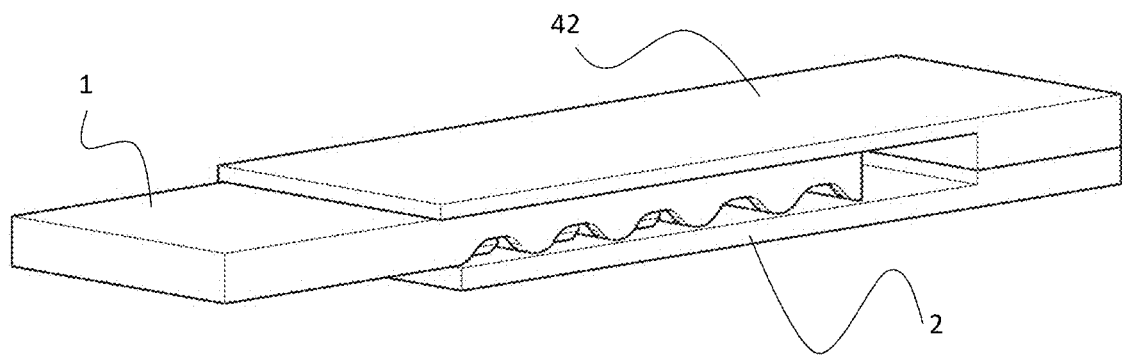
FIG. 23*a*: A perspective view of a mounted composite button consisting of one receiving element and two blocking elements. The pins of one blocking element interlock with those of the other.
Figure 23B:
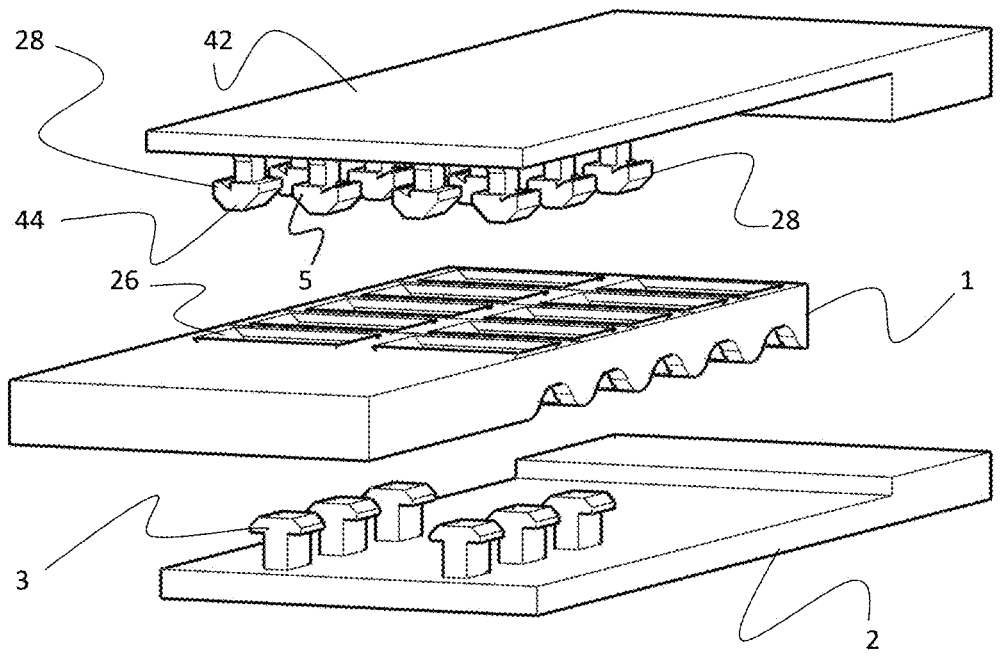
FIG. 23*b*: A perspective view illustrating the separate components of a composite button made up of one receiving element and two blocking elements.
Figure 23C:
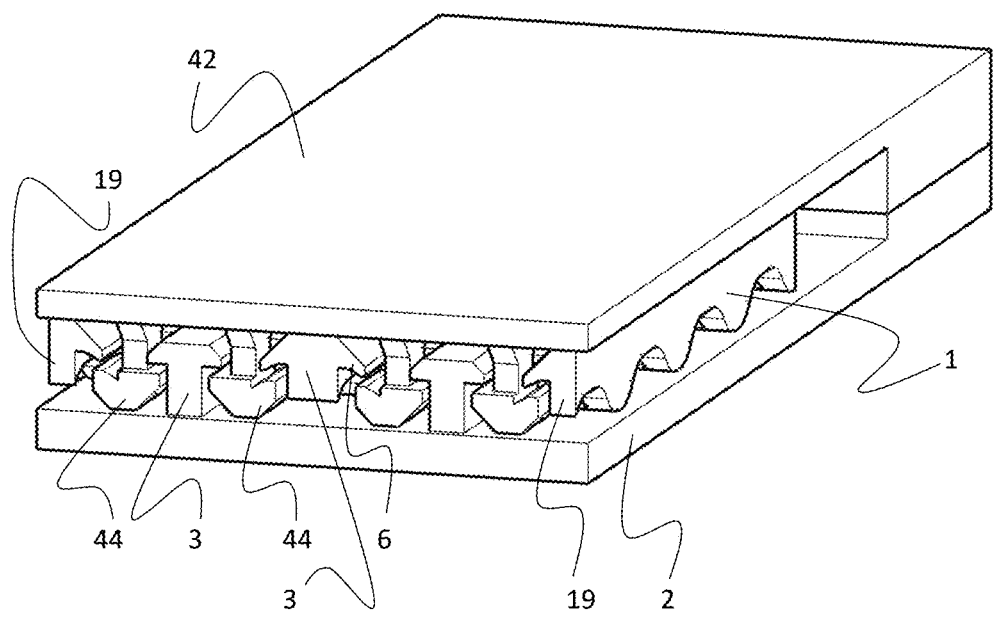
FIG. 23*c*: A cross-sectional perspective view of a mounted composite button comprising one receiving element and two blocking elements.

The version shown in FIGS. 23a, 23b and 23c is a combination of a second click element with recesses and ribs at the bottom 1, a first click element with pins 2, wherein the pins have at least one set of lips 2, and an element with double pins 42. When mounting, the element with double pins 42 is first pressed into the second click element with recesses and ribs at the bottom 1, with the outer barbed lip 28 hooking into the barbed rib 26. After this, the second click element with recesses and ribs at the bottom 1 is pressed into the element with double pins 42, and the single-lip pin 3 is pressed between the pin with asymmetrically arranged barbs 44. The barbed lip 28 of the single-lip pin 3 of the first click element with pins 2, wherein the pins have at least one set of lips 2 behind the lip 5 of the pin with asymmetrically arranged barbs 44 of the element with double pins 42.

Figure 24A:
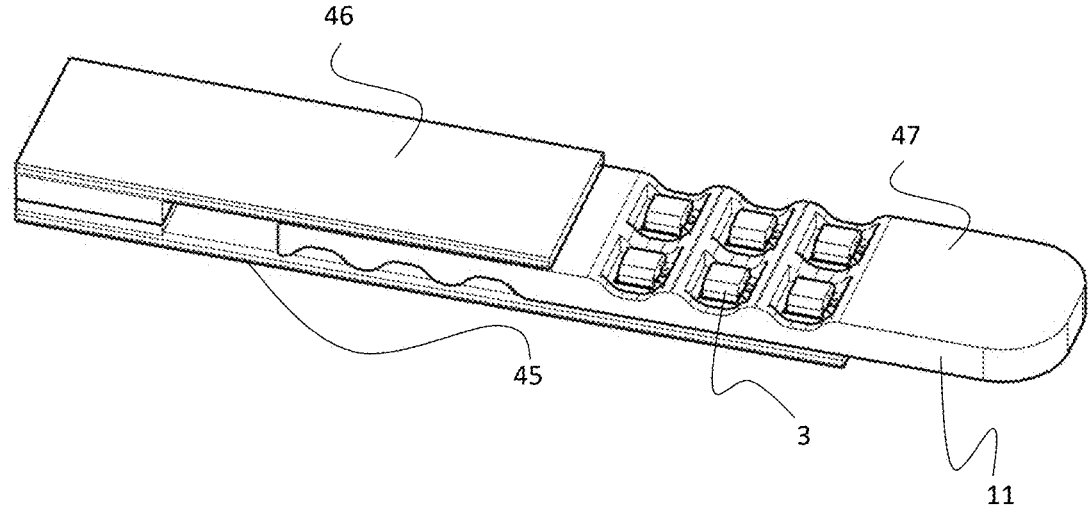
FIG. 24*a*: A perspective view of a mounted composite button, including one receiving element and two blocking elements. The receiving part consists of two segments, with the ribs of these segments oriented in opposite directions.
Figure 24B:
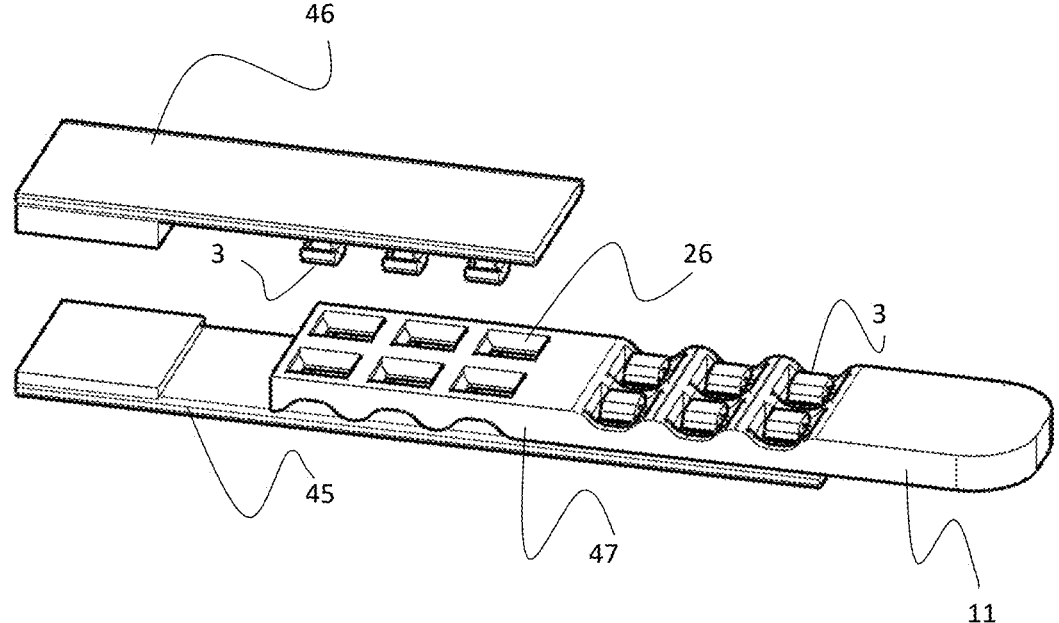
FIG. 24*b*: A perspective view depicting the different components of a composite button with one receiving element and two blocking elements. The receiving part is formed by two segments with ribs arranged oppositely.

An alternative version is the composition as shown in FIGS. 24a and 24b. This version is a combination of a click element with recesses and ribs arranged opposite each other 47 with a click element with pins long side 45 and click element with pins short side 46. The click element with recesses and ribs arranged opposite each other 47 forms the base, which is provided with x number of recesses where the barbed rib 26 is provided on one side and x number of recesses with barbed rib 26 on the other side. Depending on the desired solution, the single-lip pin 3 of the click element with pins short side 46 in one set with recesses can be applied on one side and the single-lip pin 3 of the click element with pins long side 45 in the other set with recesses on the other side. Also, in this configuration, the click element with recesses and ribs arranged opposite each other 47 is clamped on both sides.

When applying force to the connection in the longitudinal direction, the flank pushes against the flank of the pin 49 of the first click element with pins 2 against the inner flank of the recess wall 48 of the second click element with recesses and ribs at the bottom 1. If these flanks are straight, there is a chance that the single-lip pin 3 will be pulled out of the recess within the second click element 7. To counteract this, it is advisable to give the flanks a shape that can prevent them from pulling loose.

Figure 25:
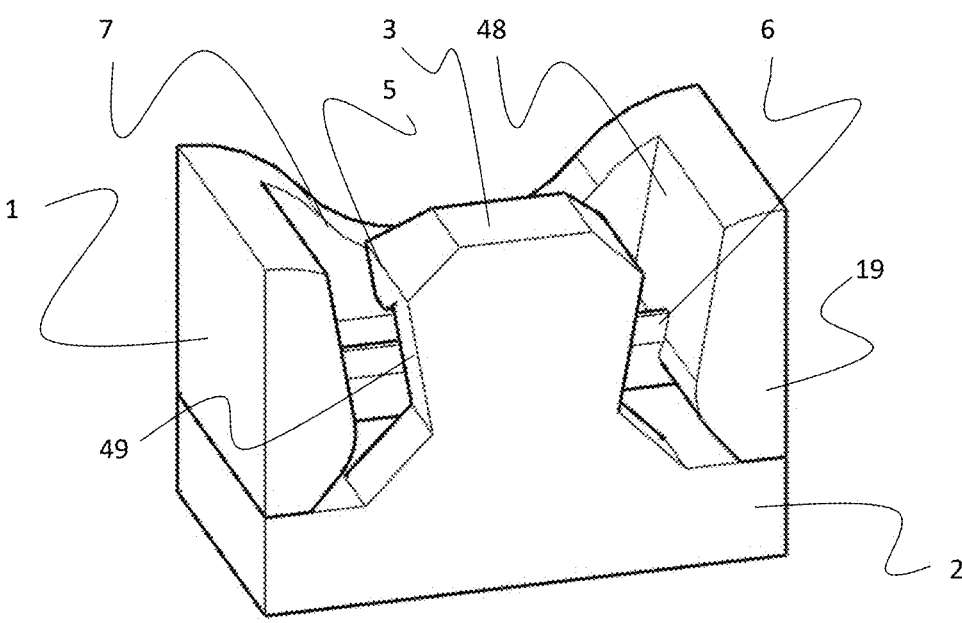
FIG. 25: A cross-sectional perspective view detailing a pin from a first click element inserted into the recess of a second click element. The recess and pin flanks are positioned at a specific angle.

FIG. 25 shows a solution in which the flank of the pin 49 is at an angle of 20° and the inner flank of the recess wall 48 is also at an angle of 20° When tensioning the second click element with recesses and ribs at the bottom 1 compared to the first click element with pins 2, the flank of the pin 49 pushes along one side of the pin against the inner flank of the recess wall 48 from the second click element with recesses and ribs at the bottom 1. This forms a kind of tooth connection that makes it harder for the single-lip pin 3 to slide out of the recess within the second click element 7.

Figure 26:
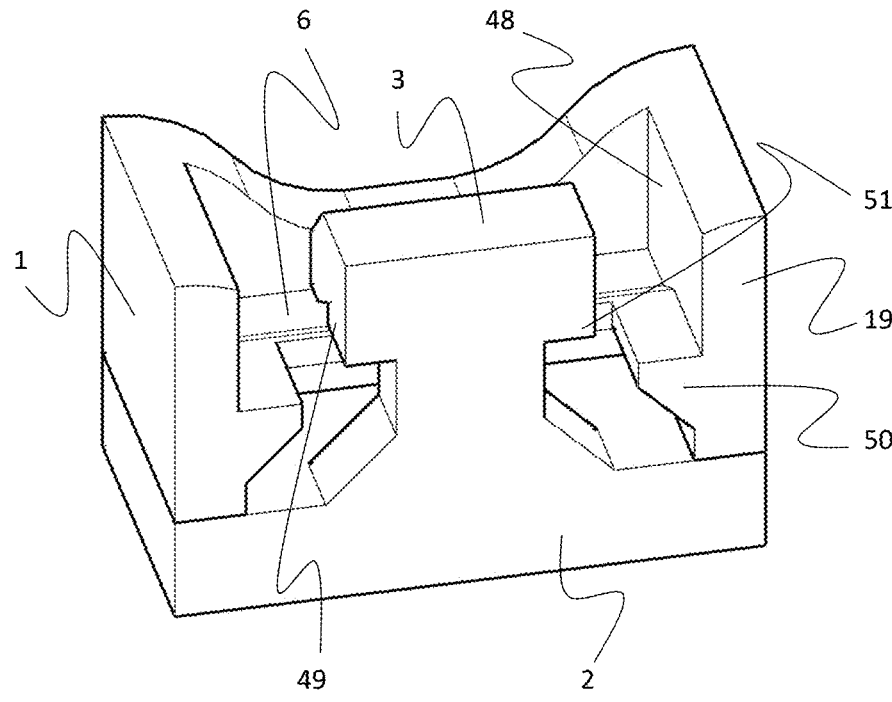
FIG. 26: A cross-sectional perspective view detailing a pin from a first click element inserted into the recess of a second click element. The recess and pin flanks are equipped with teeth.

FIG. 26 shows a solution in which the flank of the pin 49 is provided with a tooth of the pin 51 and the inner flank of the recess wall 48 is also provided with an inner flank tooth 50. When applying force to the second click element with recesses and ribs at the bottom 1 compared to the first click element with pins 2, the head of the flank of the pin 49 pushes along one side of the pin against an inner flank of the recess wall 48 of the second click element with recesses and ribs at the bottom 1. The underside of the tooth of the pin 51 is at the same height as the tops of the inner flank tooth 50, creating a lock in the form of a tooth connection. It is of note that the pin of this embodiment is equally suitable for combination with other types of recesses, such as those exemplified in FIG. 1-4, 7-9, 12 or 20. In particular, recess configurations with the ribs at the corners have proven to be especially favorable.

In the versions as in FIGS. 25 and 26 where the dimensions of the base of the pins 3 in the longitudinal direction of the recess 7 are smaller than the opening 7 in the longitudinal direction of the recess 7, it is possible to bend the base of the elements 1 and 2 if they are connected. This makes it possible to make versions such as the cable binder 19.

During the bending of the second click element 1, the pins 3 of the first click element 2 in the recess 7 of the second click element 1 move in a longitudinal direction, leaving the lip 5 of the pin 3 behind the rib 6.

The longitudinal ratio of the dimensions of the base of the pin 3 to the dimensions of the recess 7 largely determines the extent to which the assembled elements 1 and 2 can bend.

An additional alternative embodiment of a shape as shown in FIG. 26 is in which the flank of the pin 49 is provided with a tooth of the pin 51 and the inner flank of the recess wall 48 is also provided with an inner flank tooth 50 but the recess 7 are only equipped with the inner flank tooth in the longitudinal direction and therefore no additional ribs 6 are provided.

Figure 27:
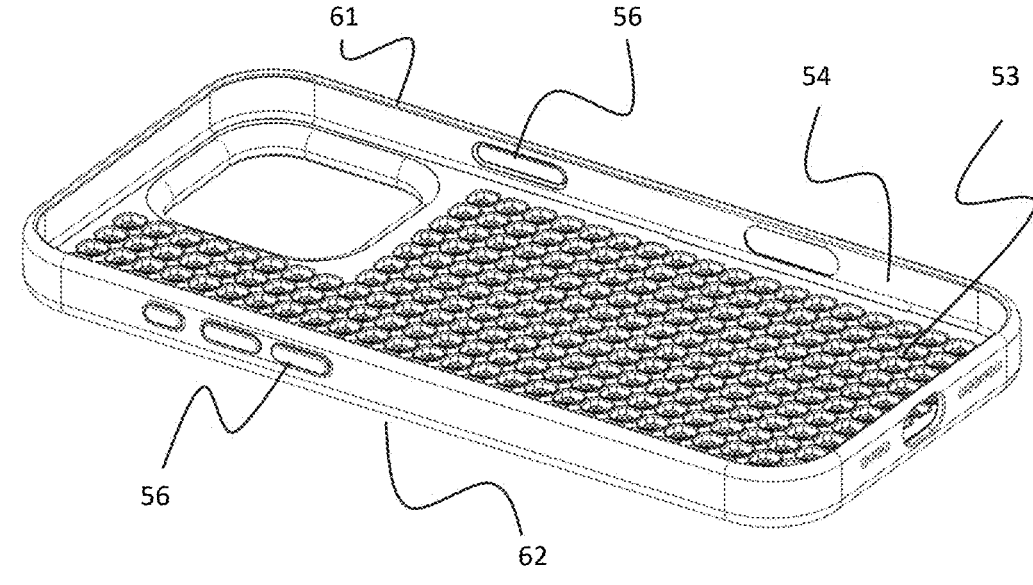
FIG. 27: A perspective view depicting a commercial version of a mobile phone cover with integrated buttons.

FIG. 27 shows a commercial version of the mobile phone cover 34. This mobile phone cover with integrated buttons 62 is equipped with a raised edge of the cover 54, which is preferably made of a softer material than the base plate of the cover 53. The base plate of the cover 53 is preferably a harder plate that remains minimally flexible, such as polycarbonate with a Rockwell R-scale hardness of 15 or Shore D70-80. The raised edge of the cover 54 is preferably made of a softer material such as TPU, with a hardness between Shore D50 and D65 if it is composed entirely of the soft material.

Figure 30:
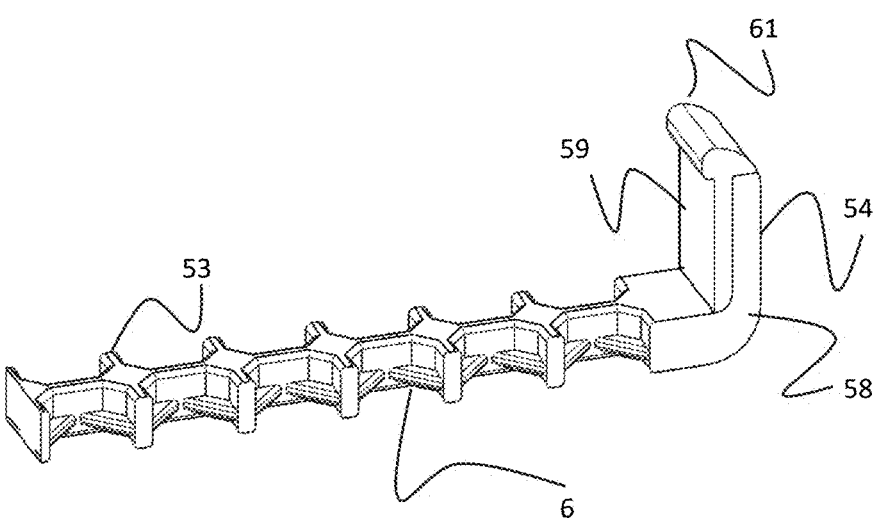
FIG. 30: A perspective view of a detail of the raised edge of the mobile phone cover where the raised edge is connected to the base plate via overmolding on the inside of the raised edge of the base plate.
Figure 31:
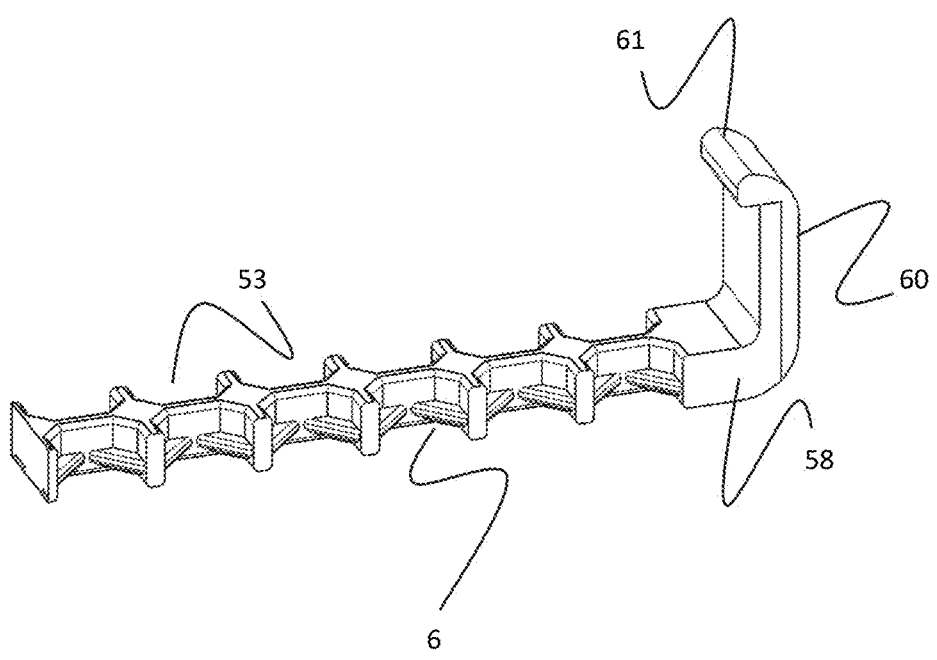
FIG. 31: A perspective view of a detail of the raised edge of the mobile phone cover where the raised edge is connected to the base plate via overmolding on the outside of the raised edge of the base plate.
Figure 32:
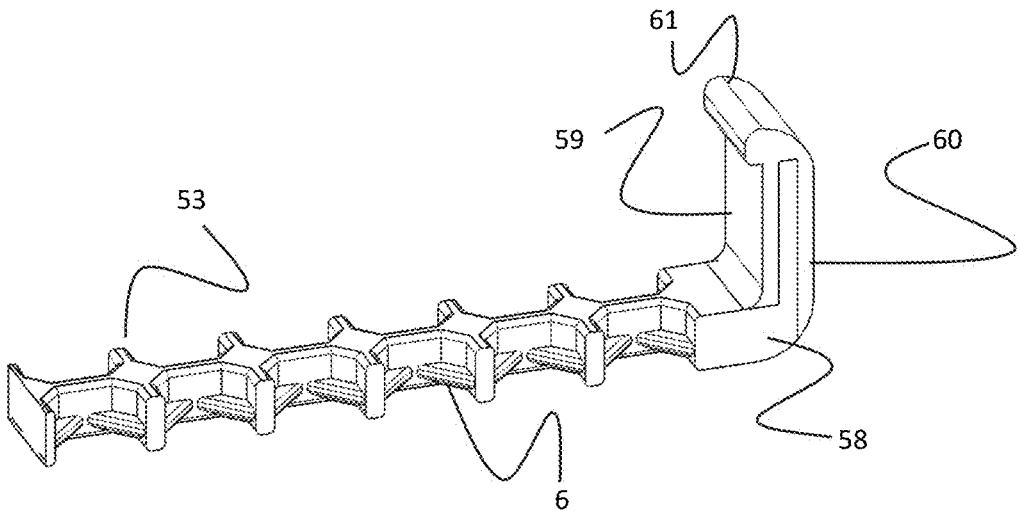
FIG. 32: A perspective view of a detail of the raised edge of the mobile phone cover where the raised edge is connected to the base plate via overmolding on the inside and outside of the raised edge of the base plate.

If the raised edge of the cover 54 is part of the structure and includes an upstanding rim belonging to the base plate of the cover 53, as shown in FIGS. 30, 31, and 32, then the soft material component may have a hardness around Shore D35.

If the raised edge of the cover 54 is made of the softer material (e.g., Shore D35), then the mobile phone cover 34 can be fitted with fixed buttons 56. This is usually the case in embodiments shown in FIGS. 30, 31, and 32, where the raised edge of the cover 54 is at least partially equipped with the raised edge of the base plate 58, and where the inner layer 59 in FIG. 30, the inner layer 59 and outer layer 60 in FIG. 32, and the outer layer 60 in FIG. 31 are made of soft materials such as Shore D35.

Figure 28:
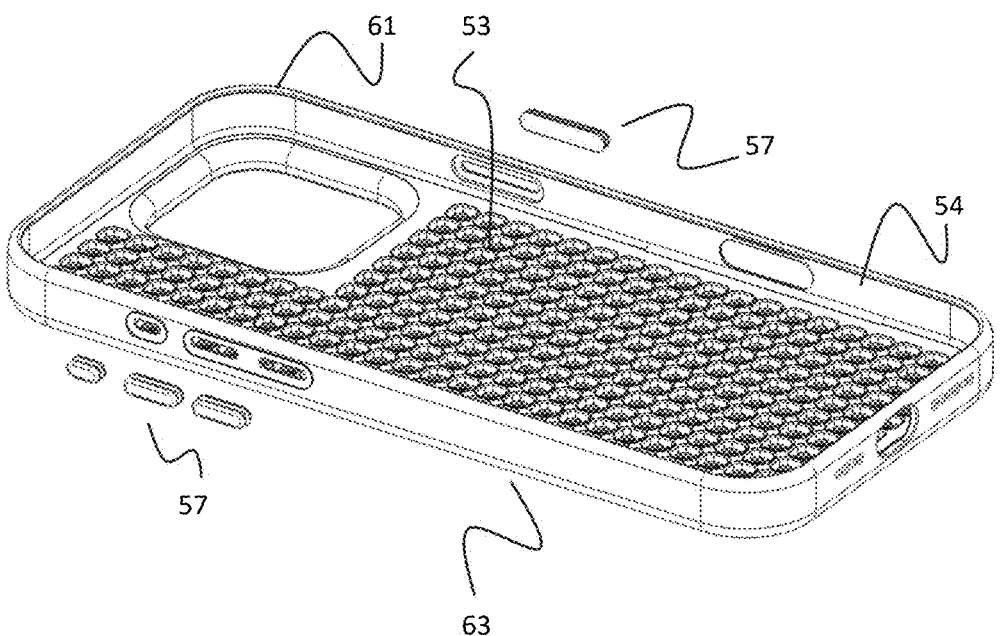
FIG. 28: A perspective view depicting a commercial version of a mobile phone cover with loose and replaceable buttons.
Figure 29:
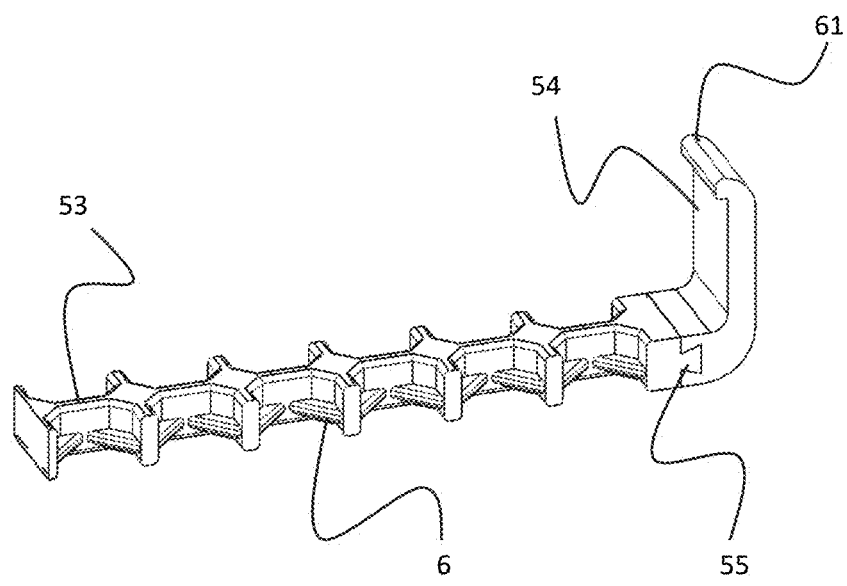
FIG. 29: A perspective view of a detail of the raised edge of the mobile phone cover where the raised edge is connected to the base plate via overmolding and dovetail joints.

If the raised edge of the cover 54 is not provided with a raised edge of the base plate 58 and consists solely of a softer material harder than Shore D35, for example Shore D55, then the mobile phone cover 34 is preferably designed as a mobile phone cover with replaceable buttons 63, as shown in FIG. 28. In this case, the cover includes loose buttons 57 that are embedded in the cover and can move relatively freely within it. This version of the raised edge of the cover 54 is shown in FIG. 29. The transition between the base plate of the cover 53 and the raised edge of the cover 54 preferably runs through a dovetail joint 55 to ensure a strong, efficient, and durable bond between the relatively hard material of the base plate of the cover 53 and the soft material of the raised edge of the cover 54.

Experience shows that the material forming the clamp edge 61 should not exceed Shore D80 in hardness and preferably remains below Shore D70, to allow the finished cover to be removed from the mold without deformation during production.

The configuration where a mobile phone cover 34 is built from a harder base plate of the cover 53—equipped with the attachment technology described in this document—in combination with a softer raised edge of the cover 54, whether or not further enhanced with a raised edge of the base plate 58 and additional layers, is new and unique.

Figure 33:
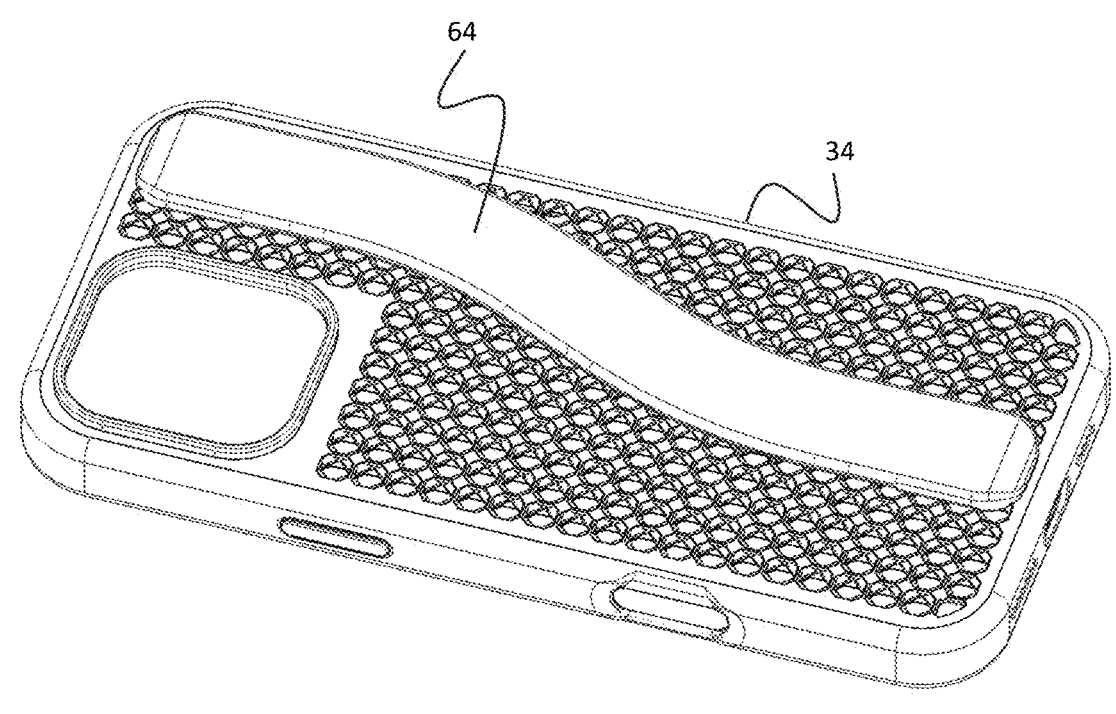
FIG. 33: A perspective view depicting a commercial version of a mobile phone cover in combination with a removable strap.
Figure 34:
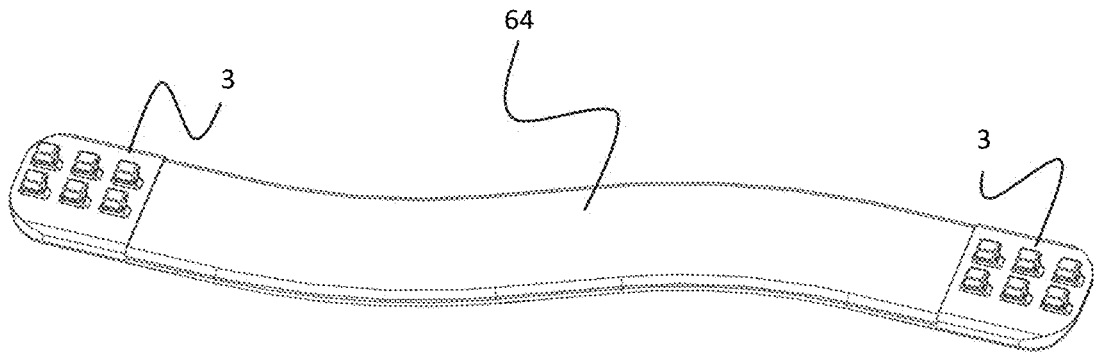
FIG. 34: A perspective view of the multifunctional and clickable strap.

A possible accessory for the mobile phone cover 34 is shown in FIGS. 33 and 34. The multifunctional strap 64 is a flexible strap fitted with a pin, arranged in a specific pattern along the multifunctional strap 64, creating a stable and flexible connection with the base plate of the cover 53 of the mobile phone cover 34. The base of the multifunctional strap 64 can be either straight or slightly curved, as shown in FIG. 34.

During use, the multifunctional strap 64 stretches slightly. To compensate for this, the distance between the center points of the pin at the ends of the multifunctional strap 64 is preferably 1 mm to 3 mm shorter than the distance between the center points of the openings in the base plate of the cover 53, into which the pin of the multifunctional strap 64 fits.

The multifunctional strap 64 is preferably made of TPU or TPE with a hardness around Shore D35.

The purpose of the multifunctional strap 64 is to enable multiple functions, such as: an additional handgrip for holding the phone more comfortably, a stand to position the phone semi-upright (in portrait or landscape), a mounting hook, and many other potential applications.

The invention claimed is:

1. A phone cover assembly comprising a phone cover accessory as a first click element and a phone cover as a second click element, the first click element comprises a coupling surface of the first click element and the second click element comprises a coupling surface of the second click element and four raised edges for embracing a mobile phone, wherein the coupling surface of the first click element comprises a plurality of coupling pins that are flexible and the coupling surface of the second click element comprises a plurality of recesses, the plurality of recesses dimensioned for clamping receiving of the plurality of coupling pins, wherein the plurality of coupling pins comprise a base portion and a top portion, the top portion narrowing towards an apex of the top portion, the top portion having a conical, pyramidal, truncated conical or truncated pyramidal shape, and wherein the top portion comprises at least one lip that are overhanging, which extend radially relative to the base portion, wherein the lips comprise a bottom surface that is perpendicular to a longitudinal axis of one of the plurality of coupling pins and/or slants downwards to the coupling surface of the first click element as it extends radially, and wherein the lips have a maximal length over which they extend from the base portion, and the lips have an average thickness along the longitudinal axis of the pins, wherein said length and said average thickness have a ratio between 0.25 and 1.0, wherein the plurality of recesses comprise a through-hole, and wherein the through-hole comprises at least one rib extending inwardly from a perimeter of the through-hole, the through-hole having an opening reduced by the ribs to restrict unobstructed passage of the top portion and only allowing passage of the top portion under a predetermined minimal force or pressure exerted on the coupling surface of the first click element and the coupling surface of the second click element towards each other, and wherein the opening is dimensioned to allow unobstructed passage of at least a superior segment of the base portion when projections of the lips and the ribs along the longitudinal axis of the pins are at least partly overlapping.

2. The phone cover assembly according to claim 1, wherein the coupling surface comprises a camera lens opening.

3. A phone cover assembly comprising a phone cover accessory as a first click element and a phone cover as a second click element, the first click element comprises a coupling surface of the first click element and the second click element comprises a coupling surface of the second click element and four raised edges for embracing a mobile phone, wherein the coupling surface of the first click element comprises a plurality of coupling pins that are flexible and the coupling surface of the second click element comprises a plurality of recesses, the plurality of recesses dimensioned for clamping receiving of the plurality of coupling pins, wherein the plurality of coupling pins comprise a base portion and a top portion, the top portion narrowing towards an apex of the top portion, the top portion having a conical, pyramidal, truncated conical or truncated pyramidal shape, and wherein the top portion comprises at least one lip that are overhanging, which extend radially relative to the base portion, wherein the lips comprise a bottom surface that is perpendicular to a longitudinal axis of one of the plurality of coupling pins and/or slants downwards to the coupling surface of the first click element as it extends radially, and wherein the base portion comprises a diameter of at least 1.0 mm, wherein the plurality of recesses comprise a through-hole, and wherein the through-hole comprises at least one rib extending inwardly from a perimeter of the through-hole, the through-hole having an opening reduced by the ribs to restrict unobstructed passage of the top portion and only allowing passage of the top portion under a predetermined minimal force or pressure exerted on the coupling surface of the first click element and the coupling surface of the second click element towards each other, and wherein the opening is dimensioned to allow unobstructed passage of at least a superior segment of the base portion when projections of the lips and the ribs along the longitudinal axis of the pins are at least partly overlapping.

4. The phone cover assembly according to claim 3, wherein the coupling surface comprises a camera lens opening.

5. A phone cover assembly comprising a phone cover accessory as a first click element and a phone cover as a second click element, the first click element comprises a coupling surface of the first click element and the second click element comprises a coupling surface of the second click element and four raised edges for embracing a mobile phone, wherein the coupling surface of the first click element comprises a plurality of coupling pins that are flexible and the coupling surface of the second click element comprises a plurality of recesses, the plurality of recesses dimensioned for clamping receiving of the plurality of coupling pins, wherein the plurality of coupling pins comprise a base portion and a top portion, the top portion narrowing towards an apex of the top portion, the top portion having a conical, pyramidal, truncated conical or truncated pyramidal shape, and wherein the top portion comprises at least one lip that are overhanging, which extend radially relative to the base portion, wherein the lips comprise a bottom surface that is perpendicular to a longitudinal axis of one of the plurality of coupling pins and/or slants downwards to the coupling surface of the first click element as it extends radially, wherein the plurality of recesses comprise a through-hole, and wherein the through-hole comprises at least one rib extending inwardly from a perimeter of the through-hole, and wherein the lips extend from the perimeter over a distance of at least 0.2 mm, the through-hole having an opening reduced by the ribs to restrict unobstructed passage of the top portion and only allowing passage of the top portion under a predetermined minimal force or pressure exerted on the coupling surface of the first click element and the coupling surface of the second click element towards each other, and wherein the opening is dimensioned to allow unobstructed passage of at least a superior segment of the base portion when projections of the lips and the ribs along the longitudinal axis of the pins are at least partly overlapping.

6. The phone cover assembly according to claim 5, wherein the coupling surface comprises a camera lens opening.

7. A phone cover assembly comprising a phone cover accessory as a first click element and a phone cover as a second click element, the first click element comprises a coupling surface of the first click element and the second click element comprises a coupling surface of the second click element and four raised edges for embracing a mobile phone, wherein the coupling surface of the first click element comprises a plurality of coupling pins that are flexible and the coupling surface of the second click element comprises a plurality of recesses, the plurality of recesses dimensioned for clamping receiving of the plurality of coupling pins, wherein the plurality of coupling pins comprise a base portion and a top portion, the top portion narrowing towards an apex of the top portion, the top portion having a conical, pyramidal, truncated conical or truncated pyramidal shape, and wherein the top portion comprises at least one lip that are overhanging, which extend radially relative to the base portion, wherein the lips comprise a bottom surface that is perpendicular to a longitudinal axis of one of the plurality of coupling pins and/or slants downwards to the coupling surface of the first click element as it extends radially, wherein the plurality of recesses comprise a through-hole, and wherein the through-hole comprises at least one rib extending inwardly from a perimeter of the through-hole, and wherein the ribs have a maximal thickness of about 1.5 mm, and/or wherein the ribs have a minimal thickness of about 0.2 mm, the through-hole having an opening reduced by the ribs to restrict unobstructed passage of the top portion and only allowing passage of the top portion under a predetermined minimal force or pressure exerted on the coupling surface of the first click element and the coupling surface of the second click element towards each other, and wherein the opening is dimensioned to allow unobstructed passage of at least a superior segment of the base portion when projections of the lips and the ribs along the longitudinal axis of the pins are at least partly overlapping.

8. The phone cover assembly according to claim 7, wherein the coupling surface comprises a camera lens opening.

9. A phone cover assembly comprising a phone cover accessory as a first click element and a phone cover as a second click element, the first click element comprises a coupling surface of the first click element and the second click element comprises a coupling surface of the second click element and four raised edges for embracing a mobile phone, wherein the coupling surface of the first click element comprises a plurality of coupling pins that are flexible and the coupling surface of the second click element comprises a plurality of recesses, the plurality of recesses dimensioned for clamping receiving of the plurality of coupling pins, wherein the plurality of coupling pins comprise a base portion and a top portion, the top portion narrowing towards an apex of the top portion, the top portion having a conical, pyramidal, truncated conical or truncated pyramidal shape, and wherein the top portion comprises at least one lip that are overhanging, which extend radially relative to the base portion, wherein the lips comprise a bottom surface that is perpendicular to a longitudinal axis of one of the plurality of coupling pins and/or slants downwards to the coupling surface of the first click element as it extends radially, wherein the plurality of recesses comprise a through-hole, and wherein the through-hole comprises at least one rib extending inwardly from a perimeter of the through-hole, the through-hole having an opening reduced by the ribs to restrict unobstructed passage of the top portion and only allowing passage of the top portion under a predetermined minimal force or pressure exerted on the coupling surface of the first click element and the coupling surface of the second click element towards each other, and wherein the opening is dimensioned to allow unobstructed passage of at least a superior segment of the base portion when projections of the lips and the ribs along the longitudinal axis of the pins are at least partly overlapping, wherein the overlapping parts of the ribs and the lips when at least one of the plurality of coupling pins is received in the recess are at least 5% of a maximal cross-sectional surface area of the top portion, and wherein the lips corresponding to said overlapping parts have an average thickness of at least 0.25 mm.

10. The phone cover assembly according to claim 9, wherein the coupling surface comprises a camera lens opening.

11. A phone cover assembly comprising a phone cover accessory as a first click element and a phone cover as a second click element, the first click element comprises a coupling surface of the first click element and the second click element comprises a coupling surface of the second click element and four raised edges for embracing a mobile phone, wherein the coupling surface of the first click element comprises a plurality of coupling pins that are flexible and the coupling surface of the second click element comprises a plurality of recesses, the plurality of recesses dimensioned for clamping receiving of the plurality of coupling pins, wherein the plurality of coupling pins comprise a base portion and a top portion, the top portion narrowing towards an apex of the top portion, the top portion having a conical, pyramidal, truncated conical or truncated pyramidal shape, and wherein the top portion comprises at least one lip that are overhanging, which extend radially relative to the base portion, wherein the lips comprise a bottom surface that is perpendicular to a longitudinal axis of one of the plurality of coupling pins and/or slants downwards to the coupling surface of the first click element as it extends radially, wherein the plurality of recesses comprise a through-hole, and wherein the through-hole comprises at least one rib extending inwardly from a perimeter of the through-hole, the through-hole having an opening reduced by the ribs to restrict unobstructed passage of the top portion and only allowing passage of the top portion under a predetermined minimal force or pressure exerted on the coupling surface of the first click element and the coupling surface of the second click element towards each other, wherein the opening is dimensioned to allow unobstructed passage of at least a superior segment of the base portion when projections of the lips and the ribs along the longitudinal axis of the pins are at least partly overlapping, and wherein the base portion has an essentially rectangular, longitudinal cross-section with a first set of two opposite sides and a second set of two opposite sides perpendicular to the first set of two opposite sides, wherein the top portion comprises two overhanging lips which extend radially relative to the base portion on the first set of two opposite sides, and wherein the top portion does not extend radially relative to the base portion on the second set of two opposite sides, and wherein the first set of two opposite sides for each of the plurality of coupling pins on the first click element are oriented parallel to a shared axis, wherein the two overhanging lips comprise a downwardly sloping and/or downwardly hooked bottom side.

12. The phone cover assembly according to claim 11, wherein the coupling surface comprises a camera lens opening.

13. A phone cover assembly comprising a phone cover accessory as a first click element and a phone cover as a second click element, the first click element comprises a coupling surface of the first click element and the second click element comprises a coupling surface of the second click element and four raised edges for embracing a mobile phone, wherein the coupling surface of the first click element comprises a plurality of coupling pins that are flexible and the coupling surface of the second click element comprises a plurality of recesses, the plurality of recesses dimensioned for clamping receiving of the plurality of coupling pins, wherein the plurality of coupling pins comprise a base portion and a top portion, the top portion narrowing towards an apex of the top portion, the top portion having a conical, pyramidal, truncated conical or truncated pyramidal shape, and wherein the top portion comprises at least one lip that are overhanging, which extend radially relative to the base portion, wherein the lips comprise a bottom surface that is perpendicular to a longitudinal axis of one of the plurality of coupling pins and/or slants downwards to the coupling surface of the first click element as it extends radially, wherein the plurality of recesses comprise a through-hole, and wherein the through-hole comprises at least one rib extending inwardly from a perimeter of the through-hole, wherein the through-hole comprises a generally rectangular, longitudinal cross-section with a first set of two opposite sides and a second set of two opposite sides perpendicular to the first set, the sides of the first set adjoining the sides of the second set and separated by corners, and wherein the ribs extend inwardly from the two opposite corners, the through-hole having an opening reduced by the ribs to restrict unobstructed passage of the top portion and only allowing passage of the top portion under a predetermined minimal force or pressure exerted on the coupling surface of the first click element and the coupling surface of the second click element towards each other, and wherein the opening is dimensioned to allow unobstructed passage of at least a superior segment of the base portion when projections of the lips and the ribs along the longitudinal axis of the pins are at least partly overlapping.

14. The phone cover assembly according to claim 13, wherein the coupling surface comprises a camera lens opening.

15. A phone cover assembly comprising a phone cover accessory as a first click element and a phone cover as a second click element, the first click element comprises a coupling surface of the first click element and the second click element comprises a coupling surface of the second click element and four raised edges for embracing a mobile phone, wherein the coupling surface of the first click element comprises a plurality of coupling pins that are flexible and the coupling surface of the second click element comprises a plurality of recesses, the plurality of recesses dimensioned for clamping receiving of the plurality of coupling pins, wherein the plurality of coupling pins comprise a base portion and a top portion, the top portion narrowing towards an apex of the top portion, the top portion having a conical, pyramidal, truncated conical or truncated pyramidal shape, and wherein the top portion comprises at least one lip that are overhanging, which extend radially relative to the base portion, wherein the lips comprise a bottom surface that is perpendicular to a longitudinal axis of one of the plurality of coupling pins and/or slants downwards to the coupling surface of the first click element as it extends radially, wherein the plurality of recesses comprise a through-hole, and wherein the through-hole comprises at least one rib extending inwardly from a perimeter of the through-hole, the through-hole having an opening reduced by the ribs to restrict unobstructed passage of the top portion and only allowing passage of the top portion under a predetermined minimal force or pressure exerted on the coupling surface of the first click element and the coupling surface of the second click element towards each other, wherein the opening is dimensioned to allow unobstructed passage of at least a superior segment of the base portion when projections of the lips and the ribs along the longitudinal axis of the pins are at least partly overlapping, wherein the base portion of the plurality of coupling pins is reinforced and comprises a broadened base bottom on at least one set of opposite sides, which extends laterally with a curved or slanted profile away from the base portion towards the coupling surface, and wherein the broadened base bottom positioned in a lower half of the base portion.

16. The phone cover assembly according to claim 15, wherein the coupling surface comprises a camera lens opening.

17. A phone cover assembly comprising a phone cover accessory as a first click element and a phone cover as a second click element, the first click element comprises a coupling surface of the first click element and the second click element comprises a coupling surface of the second click element and four raised edges for embracing a mobile phone, wherein the coupling surface of the first click element comprises a plurality of coupling pins that are flexible and the coupling surface of the second click element comprises a plurality of recesses, the plurality of recesses dimensioned for clamping receiving of the plurality of coupling pins, wherein the plurality of coupling pins comprise a base portion and a top portion, the top portion narrowing towards an apex of the top portion, the top portion having a conical, pyramidal, truncated conical or truncated pyramidal shape, and wherein the top portion comprises at least one lip that are overhanging, which extend radially relative to the base portion, wherein the lips comprise a bottom surface that is perpendicular to a longitudinal axis of one of the plurality of coupling pins and/or slants downwards to the coupling surface of the first click element as it extends radially, wherein the plurality of recesses comprise a through-hole, and wherein the through-hole comprises at least one rib extending inwardly from a perimeter of the through-hole, the through-hole having an opening reduced by the ribs to restrict unobstructed passage of the top portion and only allowing passage of the top portion under a predetermined minimal force or pressure exerted on the coupling surface of the first click element and the coupling surface of the second click element towards each other, and wherein the opening is dimensioned to allow unobstructed passage of at least a superior segment of the base portion when projections of the lips and the ribs along the longitudinal axis of the pins are at least partly overlapping, and wherein the top portion of the pins is generally rectangular, and has a set of lips on two opposite sides of the pin, and no lips on the other sides.

18. The phone cover assembly according to claim 17, wherein the coupling surface comprises a camera lens opening.

19. A phone cover assembly comprising a phone cover accessory as a first click element and a phone cover as a second click element, the first click element comprises a coupling surface of the first click element and the second click element comprises a coupling surface of the second click element and four raised edges for embracing a mobile phone, wherein the coupling surface of the first click element comprises a plurality of coupling pins that are flexible and the coupling surface of the second click element comprises a plurality of recesses, the plurality of recesses dimensioned for clamping receiving of the plurality of coupling pins, wherein the plurality of coupling pins comprise a base portion and a top portion, the top portion narrowing towards an apex of the top portion, the top portion having a conical, pyramidal, truncated conical or truncated pyramidal shape, and wherein the top portion comprises at least one lip that are overhanging, which extend radially relative to the base portion, wherein the lips comprise a bottom surface that is perpendicular to a longitudinal axis of one of the plurality of coupling pins and/or slants downwards to the coupling surface of the first click element as it extends radially, wherein the plurality of recesses comprise a through-hole, and wherein the through-hole comprises at least one rib extending inwardly from a perimeter of the through-hole, the through-hole having an opening reduced by the ribs to restrict unobstructed passage of the top portion and only allowing passage of the top portion under a predetermined minimal force or pressure exerted on the coupling surface of the first click element and the coupling surface of the second click element towards each other, and wherein the opening is dimensioned to allow unobstructed passage of at least a superior segment of the base portion when projections of the lips and the ribs along the longitudinal axis of the pins are at least partly overlapping, and wherein the lips comprise one or more barbs at a distal end thereof, extending downwards towards the coupling surface of the first click element.

20. The phone cover assembly according to claim 19, wherein the coupling surface comprises a camera lens opening.

21. A phone cover assembly comprising a phone cover accessory as a first click element and a phone cover as a second click element, the first click element comprises a coupling surface of the first click element and the second click element comprises a coupling surface of the second click element and four raised edges for embracing a mobile phone, wherein the coupling surface of the first click element comprises a plurality of coupling pins that are flexible and the coupling surface of the second click element comprises a plurality of recesses, the plurality of recesses dimensioned for clamping receiving of the plurality of coupling pins, wherein the plurality of coupling pins comprise a base portion and a top portion, the top portion narrowing towards an apex of the top portion, the top portion having a conical, pyramidal, truncated conical or truncated pyramidal shape, and wherein the top portion comprises at least one lip that are overhanging, which extend radially relative to the base portion, wherein the lips comprise a bottom surface that is perpendicular to a longitudinal axis of one of the plurality of coupling pins and/or slants downwards to the coupling surface of the first click element as it extends radially, wherein the plurality of recesses comprise a through-hole, and wherein the through-hole comprises at least one rib extending inwardly from a perimeter of the through-hole, the through-hole having an opening reduced by the ribs to restrict unobstructed passage of the top portion and only allowing passage of the top portion under a predetermined minimal force or pressure exerted on the coupling surface of the first click element and the coupling surface of the second click element towards each other, wherein the opening is dimensioned to allow unobstructed passage of at least a superior segment of the base portion when projections of the lips and the ribs along the longitudinal axis of the pins are at least partly overlapping, and wherein the phone cover accessory is a phone cover strap, wherein the phone cover strap is substantially elongate and flat with a front and a back side, and comprises the coupling surface with the coupling pins at the front side on at least each of the ends of said phone cover strap.

22. The phone cover assembly according to claim 21, wherein the coupling surface comprises a camera lens opening.

23. A phone cover assembly comprising a phone cover accessory as a first click element and a phone cover as a second click element, the first click element comprises a coupling surface of the first click element and the second click element comprises a coupling surface of the second click element and four raised edges for embracing a mobile phone, wherein the coupling surface of the first click element comprises a plurality of coupling pins that are flexible and the coupling surface of the second click element comprises a plurality of recesses, the plurality of recesses dimensioned for clamping receiving of the plurality of coupling pins, wherein the plurality of coupling pins comprise a base portion and a top portion, the top portion narrowing towards an apex of the top portion, the top portion having a conical, pyramidal, truncated conical or truncated pyramidal shape, and wherein the top portion comprises at least one lip that are overhanging, which extend radially relative to the base portion, wherein the lips comprise a bottom surface that is perpendicular to a longitudinal axis of one of the plurality of coupling pins and/or slants downwards to the coupling surface of the first click element as it extends radially, wherein the plurality of recesses comprise a through-hole, and wherein the through-hole comprises at least one rib extending inwardly from a perimeter of the through-hole, the through-hole having an opening reduced by the ribs to restrict unobstructed passage of the top portion and only allowing passage of the top portion under a predetermined minimal force or pressure exerted on the coupling surface of the first click element and the coupling surface of the second click element towards each other, wherein the opening is dimensioned to allow unobstructed passage of at least a superior segment of the base portion when projections of the lips and the ribs along the longitudinal axis of the pins are at least partly overlapping, and wherein the through-hole is essentially rectangular with two oppositely positioned long sides and two oppositely positioned short sides, with the ribs positioned at the long sides, and with an inner flank tooth or a flank bump at the short sides, wherein the lips are positioned on opposite sides of the pins and dimensioned such that the pins are wider at the lips than a distance between the ribs in the through-hole, and wherein the pins comprise one or more lateral teeth or lateral bumps on the flanks of the pins that connect the sides with the lips, said lateral teeth or said lateral bumps being configured for being suspended on the inner flank tooth or the flank bump of the plurality of recesses, and wherein the lateral teeth or the lateral bumps are dimensioned such that the pins are more narrow at the lateral teeth or the lateral bumps than the distance between the inner flank teeth of the plurality of recesses, thereby allowing movement of the pins in the plurality of recesses along the long side of the plurality of recesses.

24. The phone cover assembly according to claim 23, wherein the coupling surface comprises a camera lens opening.

\* \* \* \* \*